United States Patent
Morrison et al.

(10) Patent No.: US 12,248,082 B2
(45) Date of Patent: Mar. 11, 2025

(54) POSITION-GRID BASED MACHINE LEARNING FOR GNSS WARM-START POSITION ACCURACY IMPROVEMENT

(71) Applicant: QUALCOMM Incorporated, San Diego, CA (US)

(72) Inventors: William Morrison, San Francisco, CA (US); Songwon Jee, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 17/804,809

(22) Filed: May 31, 2022

(65) Prior Publication Data

US 2023/0384412 A1 Nov. 30, 2023

(51) Int. Cl.
*H04W 64/00* (2009.01)
*G01S 5/02* (2010.01)
*G06F 18/20* (2023.01)
*G06F 18/243* (2023.01)

(52) U.S. Cl.
CPC ...... *G01S 5/0284* (2013.01); *G06F 18/24323* (2023.01); *G06F 18/285* (2023.01); *H04W 64/006* (2013.01)

(58) Field of Classification Search
CPC ...... G01S 5/0284; G01S 19/428; G01S 19/42; G06F 18/24323; G06F 18/285; H04W 64/006
See application file for complete search history.

(56) References Cited

U.S. PATENT DOCUMENTS

| | | | | |
|---|---|---|---|---|
| 9,119,165 | B2 * | 8/2015 | Krasner | G01S 19/45 |
| 10,656,282 | B2 * | 5/2020 | Irish | G01S 19/428 |
| 2003/0107513 | A1 * | 6/2003 | Abraham | G01S 5/0036 342/357.25 |
| 2018/0210090 | A1 * | 7/2018 | Soualle | G01S 19/396 |
| 2022/0066040 | A1 * | 3/2022 | Fattouch | G01S 19/428 |
| 2022/0066053 | A1 * | 3/2022 | Maggiolo | G01S 19/25 |
| 2022/0097730 | A1 * | 3/2022 | Bacchus | G01S 19/396 |
| 2023/0382565 | A1 * | 11/2023 | Jee | G01S 19/42 |
| 2023/0384412 | A1 * | 11/2023 | Morrison | G06F 18/285 |
| 2023/0393282 | A1 * | 12/2023 | Kuismanen | G01S 19/072 |

FOREIGN PATENT DOCUMENTS

CN 112666588 A 4/2021

OTHER PUBLICATIONS

International Search Report and Written Opinion—PCT/US2023/017212—ISA/EPO—Aug. 2, 2023.

* cited by examiner

*Primary Examiner* — Julio R Perez
(74) *Attorney, Agent, or Firm* — Procopio, Cory, Hargreaves & Savitch LLP/Qualcomm

(57) ABSTRACT

Aspects presented herein may improve the performance and accuracy of GNSS-based positioning, where a position-grid based ML may be implemented by a UE or a location server to improve the accuracy of identifying a warm-start position of the UE. In one aspect, a UE or a location server determines, for each grid point within a range of an initial position of a UE, a set of PR residuals based on PRs for each SV of a set of SVs. The UE or the location server determines an estimated position of the UE based on the sets of determined PR residuals.

30 Claims, 19 Drawing Sheets

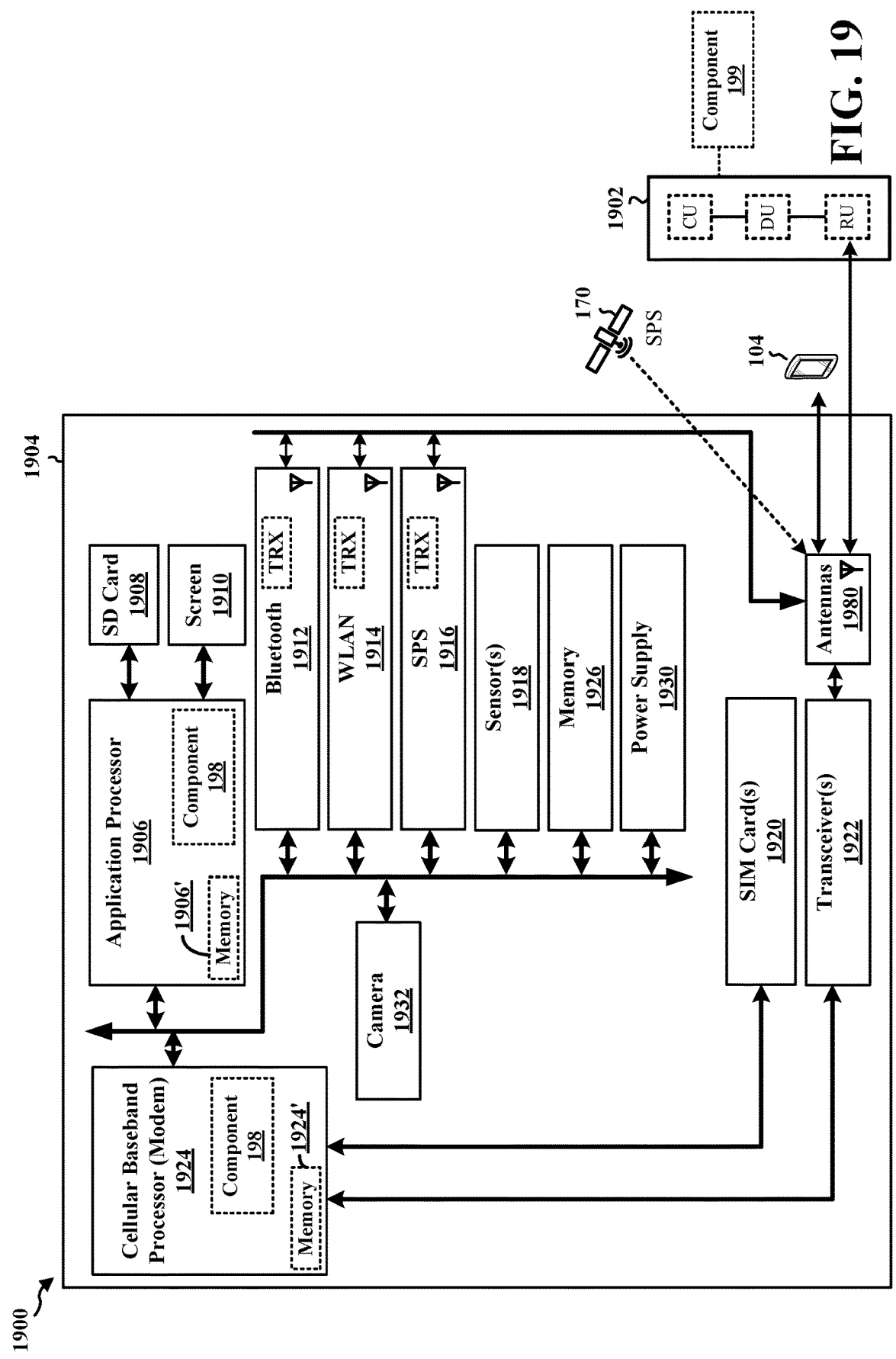

POSITION-GRID BASED MACHINE LEARNING FOR GNSS WARM-START POSITION ACCURACY IMPROVEMENT

TECHNICAL FIELD

The present disclosure relates generally to positioning systems, and more particularly, to positioning involving machine learning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus determines, for each grid point within a range of an initial position of a user equipment (UE), a set of pseudorange (PR) residuals based on PRs for each space vehicle (SV) of a set of SVs. The apparatus determines an estimated position of the UE based on the sets of determined PR residuals.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 19 is a diagram illustrating an example of a hardware implementation for an example apparatus and/or network entity.

DETAILED DESCRIPTION

Figure 1:
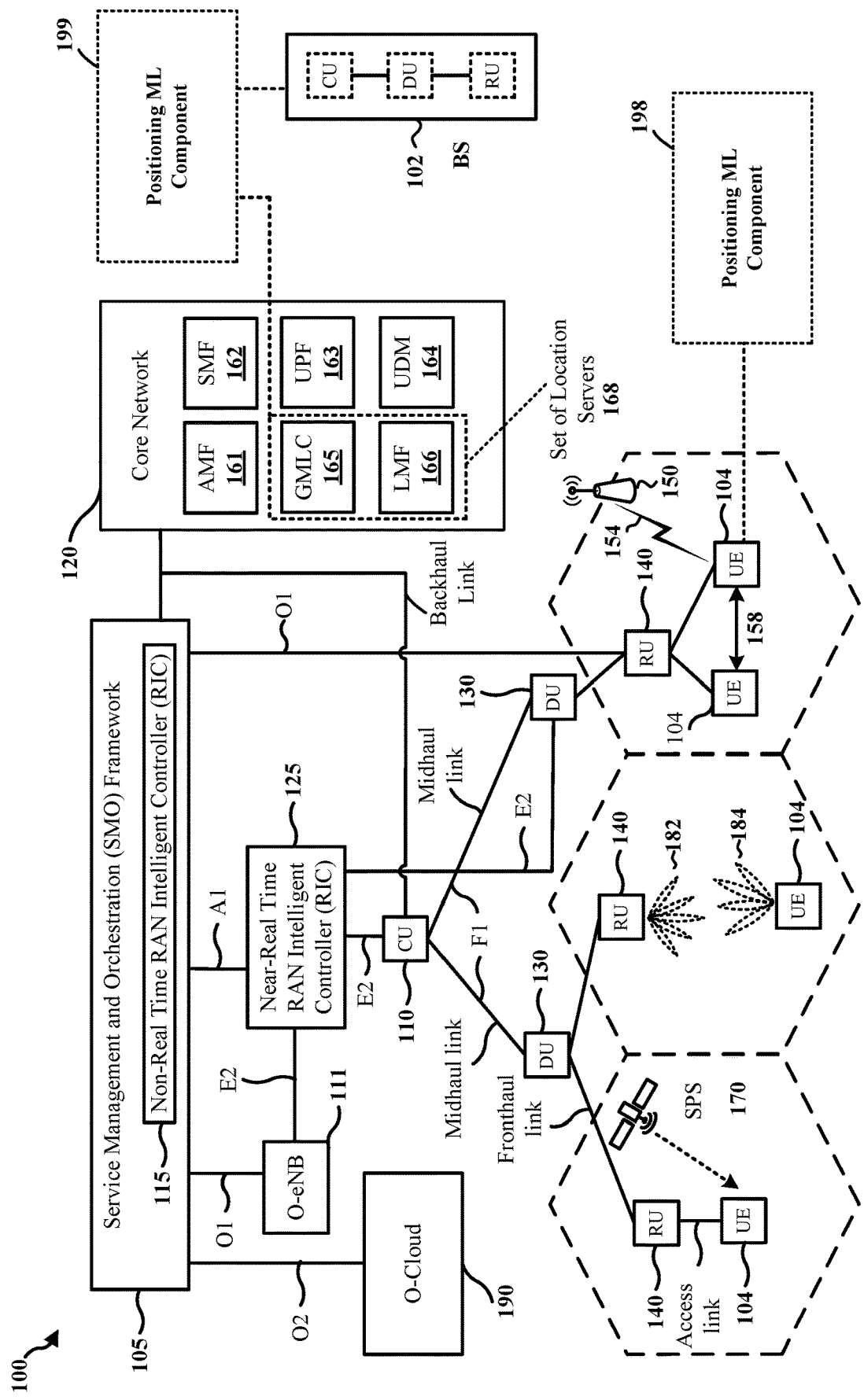
FIG. 1 is a diagram illustrating an example of a wireless communications system and an access network.

Aspects presented herein may improve the performance and accuracy of GNSS-based positioning. Aspects presented herein provide a position-grid based ML to a GNSS device to improve the accuracy of identifying a warm-start position of the GNSS device. In one aspect, a GNSS device may be configured to estimate its initial position and establish a position-grid with a fixed resolution (e.g., with multiple grid points) that covers a region of position uncertainty based on the estimated initial position. Then, the GNSS device may compute per SV PR measurement residuals at each grid point of the position-grid. An ML model may be trained to process per SV GNSS observables and PR measurement residuals obtained by the GNSS device to infer/predict the probability of whether a grid point is near the actual position of the GNSS device. For example, the ML model may be trained based on PR error estimates derived from atomic clock accurate hardware and/or the known distance between the GNSS device position and the grid point position, and the ML module may estimate the GNSS device location using the distribution of grid point probabilities across the position-grid.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit.

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (MC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, a device, which may be a UE 104, a base station 102/180, a component of the base station 102/180, or a location server (e.g., the GMLC 165, the LMF 166), may include a positioning ML component 198/199 configured to perform a position-grid based ML or a position-grid based positioning to improve the accuracy of identifying a warm-start position of the device. In one configuration, the positioning ML component 198/199 may be configured to determine, for each grid point within a range of an initial position of a UE, a set of PR residuals based on PRs for each SV of a set of SVs. In such configuration, the positioning ML component 198/199 may determine an estimated position of the UE based on the sets of determined PR residuals.

Figure 2:
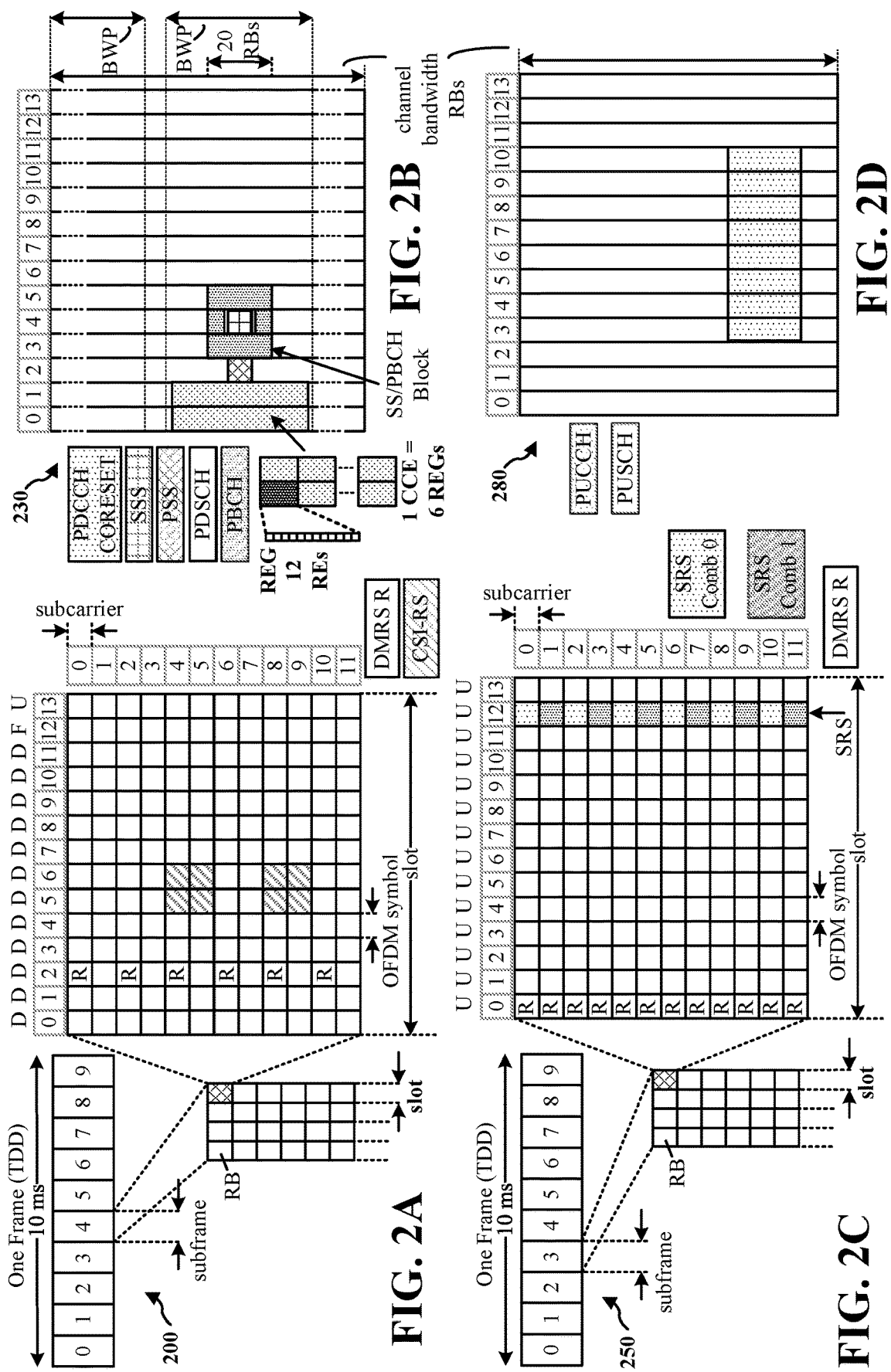
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15 [kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
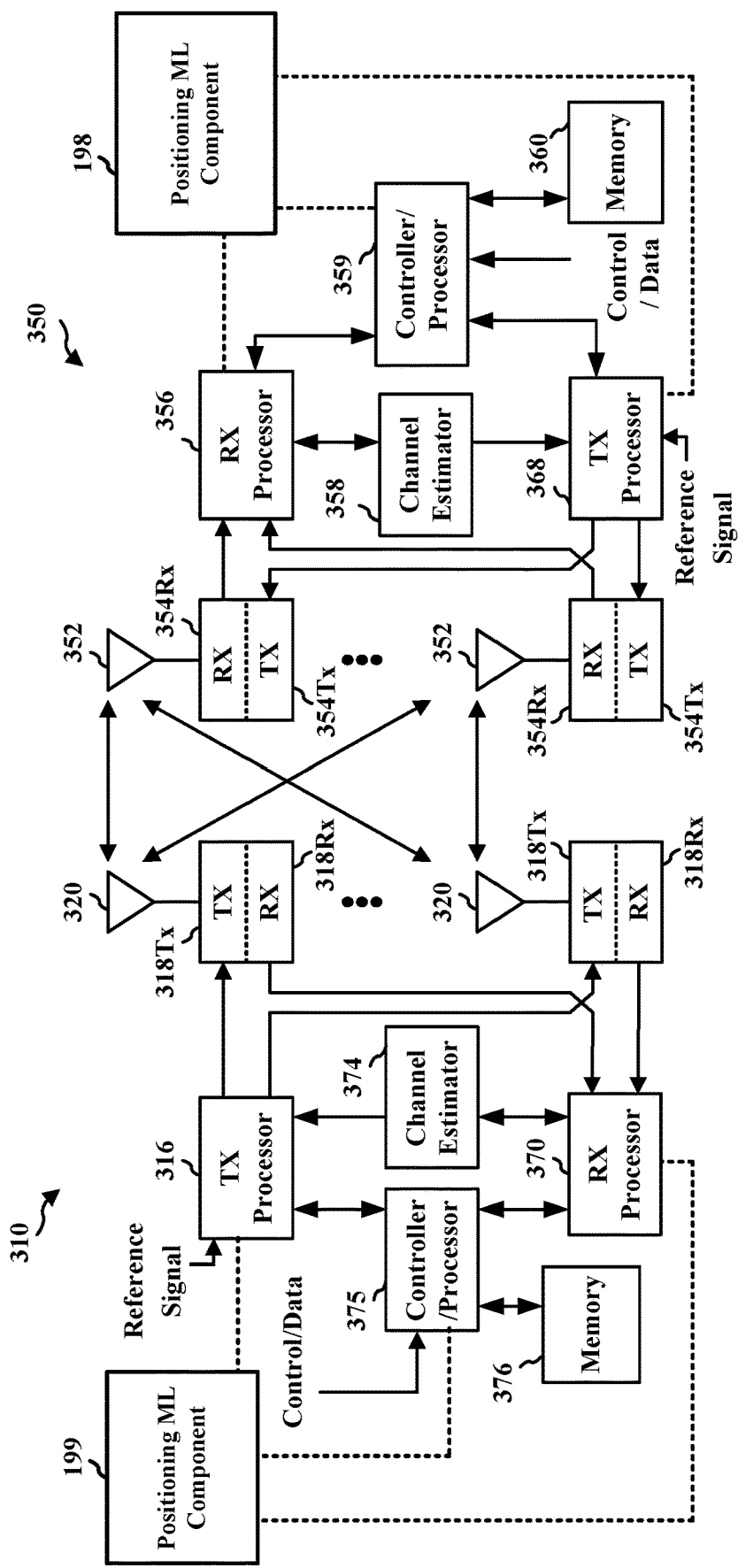
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the positioning ML component 198 of FIG. 1.

At least one of the TX processor 316, the RX processor 370, and the controller/processor 375 may be configured to perform aspects in connection with the positioning ML component 199 of FIG. 1.

Figure 4:
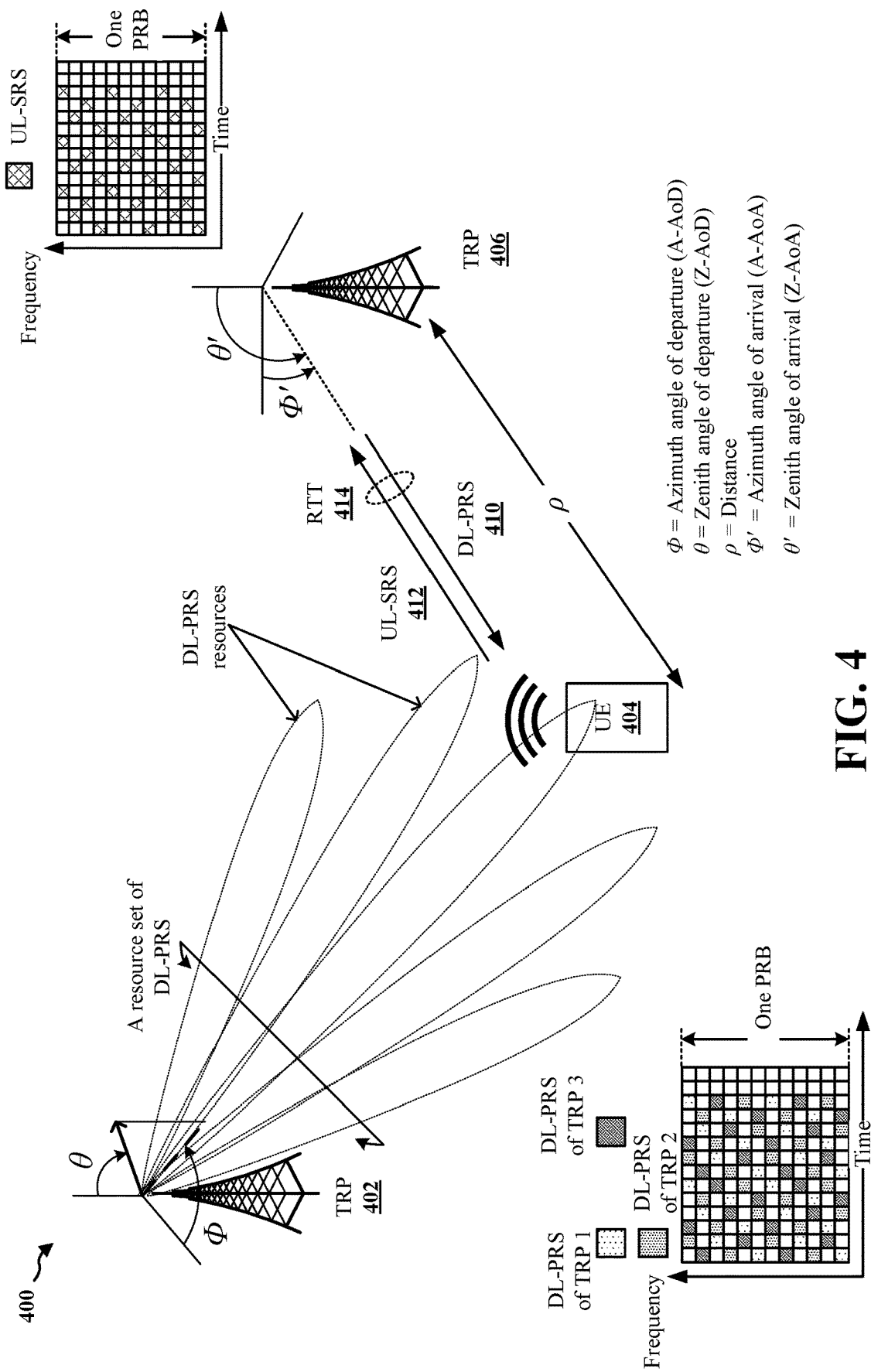
FIG. 4 is a diagram illustrating an example of a UE positioning based on reference signal measurements.

FIG. 4 is a diagram 400 illustrating an example of a UE positioning based on reference signal measurements (which may also be referred to as "network based positioning") in accordance with various aspects of the present disclosure. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s)168) or the UE 404 may determine the RTT 414 based on $\|T_{SRS\_RX} - T_{PRS\_TX}\| - |T_{SRS\_TX} - T_{PRS\_RX}\|$. Accordingly, multi-RTT positioning may make use of the UE Rx-Tx time difference measurements (i.e., $|T_{SRS\_TX} - T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX} - T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

A device equipped with a global navigation satellite system (GNSS) receiver may determine its location based on GNSS positioning. GNSS is a network of satellite s broadcasting timing and orbital information used for navigation and positioning measurements. GNSS may include multiple groups of satellites, known as constellations, that broadcast signals (which may be referred to as GNSS signals) to control stations and users of GNSS. Based on the broadcast signals, the users may be able to determine their locations (e.g., via trilateration). For purposes of the present disclosure, a device (e.g., a UE) that is equipped with a GNSS receiver or is capable of receiving GNSS signals may be referred to as a GNSS device, and a device that is capable of transmitting GNSS signals, such as a satellite, may be referred to as a space vehicle (SV).

Figure 5:
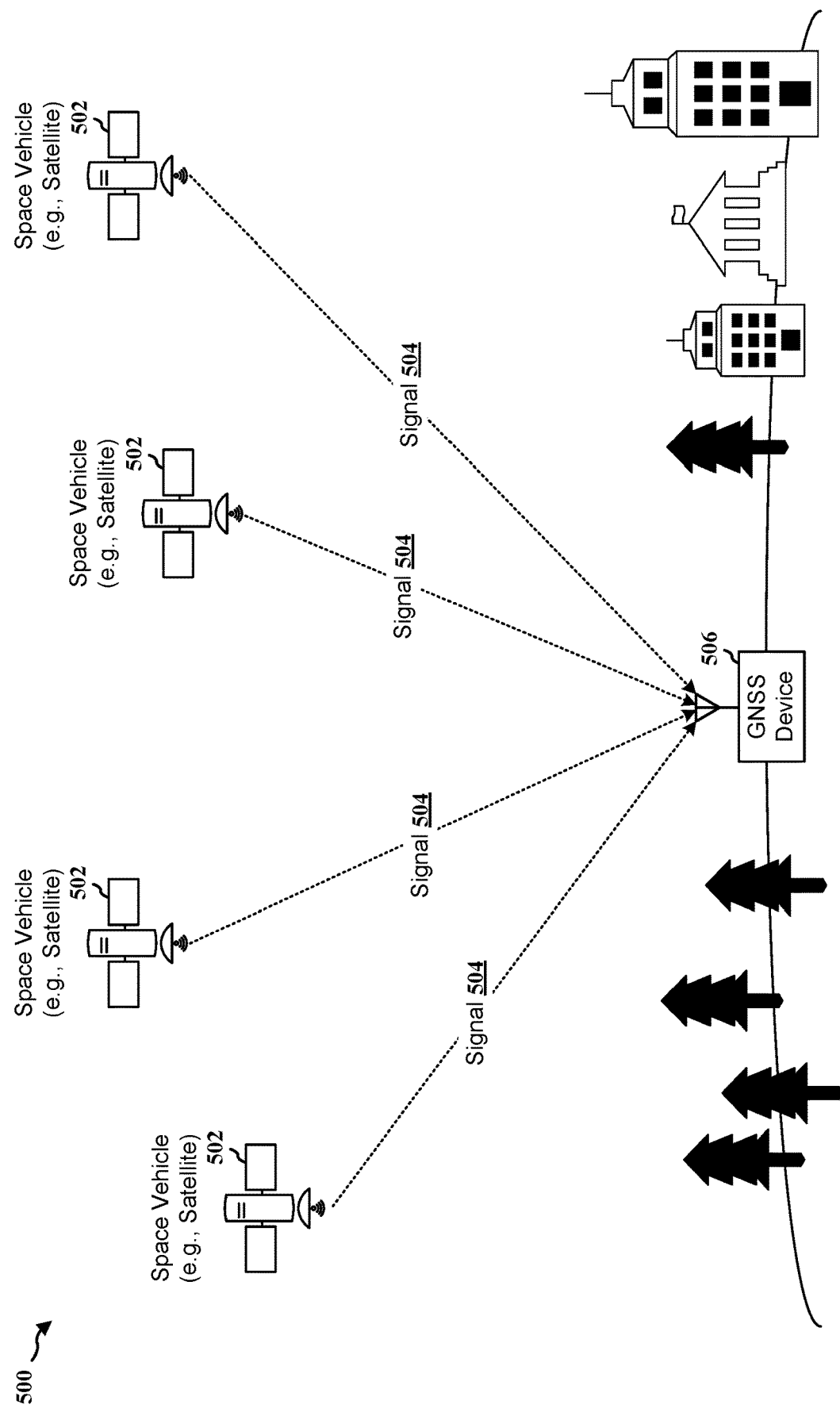
FIG. 5 is a diagram illustrating an example of Global Navigation Satellite System (GNSS) positioning in accordance with various aspects of the present disclosure.

FIG. 5 is a diagram 500 illustrating an example of GNSS positioning in accordance with various aspects of the present disclosure. A GNSS device 506 may calculate its position and time based at least in part on data (e.g., GNSS signals 504) received from multiple space vehicles (SVs) 502, where each SV 502 may carry a record of its position and time and may transmit that data (e.g., the record) to the GNSS device 506. Each SV 502 may further include a clock that is synchronized with other clocks of SVs and with ground clock(s). If an SV 502 detects that there is a drift from the time maintained on the ground, the SV 502 may correct it. The GNSS device 506 may also include a clock, but the clock for the GNSS device 506 may be less stable and precise compared to the clocks for the SVs 502.

As the speed of radio waves may be constant and independent of the satellite speed, a time delay between a time the SV 502 transmits a GNSS signal 504 and a time the GNSS device 506 receives the GNSS signal 504 may be proportional to the distance from the SV 502 to the GNSS device 506. In some examples, a minimum of four SVs may be used by the GNSS device 506 to compute/calculate one or more unknown quantities associated with positioning (e.g., three position coordinates and clock deviation from satellite time, etc.).

Each SV 502 may broadcast the GNSS signal 504 (e.g., a carrier wave with modulation) continuously that may include a pseudorandom code (e.g., a sequence of ones and zeros) which may be known to the GNSS device 506, and may also include a message that includes a time of transmission and the SV position at that time. In other words, each GNSS signal 504 may carry two types of information: time and carrier wave (e.g., a modulated waveform with an input signal to be electromagnetically transmitted). Based on the GNSS signals 504 received from the SVs 502, the GNSS device 506 may measure the time of arrivals (TOAs) of the GNSS signals 504 and calculate the time of flights (TOFs) for the GNSS signals 504. Then, based on the TOFs, the GNSS device 506 may compute its three-dimensional position and clock deviation, and the GNSS device 506 may determine its position on the Earth. For example, the GNSS device 506's location may be converted to a latitude, a longitude, and a height relative to an ellipsoidal Earth model. These coordinates may be displayed, such as on a moving map display, or recorded or used by some other system, such as a vehicle guidance system.

While the distance between a GNSS device and an SV may be calculated based on the time it takes for a GNSS signal to reach the GNSS device, the SV's signal sequence may be delayed in relation to the GNSS device's sequence. Thus, in some examples, a delay may be applied to the GNSS device's sequence, such that the two sequences are aligned. For example, to calculate the delay, a GNSS device may align a pseudorandom binary sequence contained in the SV's signal to an internally generated pseudorandom binary sequence. As the SV's GNSS signal takes time to reach the GNSS device, the SV's sequence may be delayed in relation to the GNSS device's sequence. By increasingly delaying the GNSS device's sequence, the two sequences may eventually be aligned. The accuracy of GNSS positioning may depend on various factors, such as SV geometry, GNSS signal blockage, atmospheric conditions, and/or GNSS receiver design features/quality, etc. For example, GNSS receivers used by smartphones or smart watches may have an accuracy lower than GNSS receivers used by vehicles and surveying equipment.

In some scenarios, non-line-of-sight (NLOS) GNSS measurements (e.g., measurement of GNSS signal by a GNSS device) may degrade outdoor position fix accuracy, such as within urban areas. For example, if there are obstacles, such as physical structures (e.g., buildings, tunnels) and terrains (e.g., mountains), between SVs and a GNSS device, the GNSS signals received by the GNSS device may be weakened and/or include an offset/delay.

Figure 6:
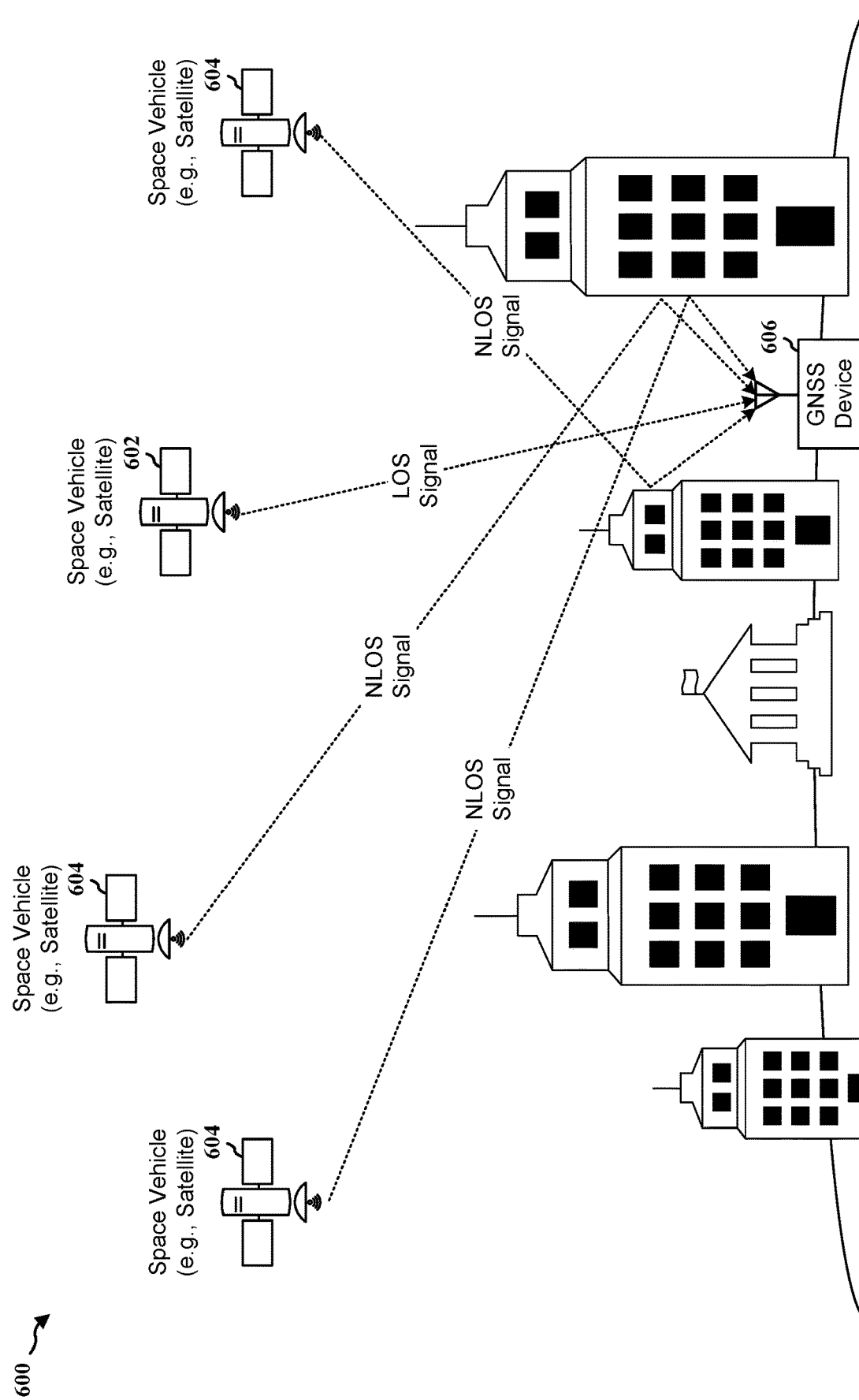
FIG. 6 is a diagram illustrating an example of non-line-of-sight (NLOS) GNSS measurements in an urban area in accordance with various aspects of the present disclosure.

FIG. 6 is a diagram 600 illustrating an example of NLOS GNSS measurements in an urban area in accordance with various aspects of the present disclosure. A GNSS device 606 may receive GNSS signals from an SV 602 based on a line-of-sight (LOS) condition (which may be referred to as LOS signals). However, due to blockage and the environmental conditions, the GNSS device 606 may receive GNSS signals from other SVs 604 based on NLOS conditions (which may be referred to as NLOS signals), where the GNSS signals from the SVs 604 may penetrate through and/or bounce off from one or more objects (e.g., buildings, trees, etc.) before reaching the GNSS device 606. As NLOS signals may typically take a longer time to reach a GNSS device compared to LOS signals, the NLOS signals may include excess delays. Thus, the positioning accuracy and speed of the GNSS device may be reduced when a number of GNSS measurements are based on NLOS conditions. This may in turn reduce the efficiency and accuracy of certain location based service (LBS) applications, such as navigation applications and ride-share application. In addition, the reduction in accuracy may be more significant during a GNSS device warm-start with large (e.g., approximate one kilometer) initial time and position uncertainty. In some examples, the continuous fix accuracy may also be degraded.

Aspects presented herein may improve the performance and accuracy of GNSS-based positioning. Aspects presented herein provide a machine learning (ML) model that utilises SV geometry and raw GNSS observables to classify GNSS pseudorange (PR) measurements in terms of the relative NLOS error (e.g., excess delays). Based on the ML classification, a GNSS device (e.g., a UE or a location server) may determine a suitable weighting for the PR measurements in GNSS position estimators (e.g., weight least square (WLS), Kalman filter (KF), etc.).

For purposes of the present disclosure, an "inference" or an "ML inference" may refer to a process of running data points into an ML model (e.g., via an inference host) to calculate an output such as a single numerical score, e.g., to use a trained ML algorithm to make a prediction. An "inference host" or an "ML inference host" may refer to a network function which hosts the ML model during an inference mode (described in details in connection with FIG. 7). Alternately, in another aspect of the present disclosure, a GNSS device (e.g., a UE) may be configured to employ computation resources and ML models to process PR measurements from different SVs and feed training data to an ML training host, where the ML training host may be collocated/associated with a server (e.g., a positioning server) for offline and/or online training of the ML models for classifying (e.g., predicting/estimating) GNSS PR measurements. Similarly, for purposes of the present disclosure, a "training" or an "ML training" may refer to a process of running data points to train or teach an ML model (e.g., via a training host). A "training host" or an "ML training host" may refer to a network function which hosts the ML model during a training mode (described in details in connection with FIG. 7). In addition, the term "pseudo-range" (or pseudorange) may refer to a pseudo distance between an SV (e.g., a satellite) and a navigation satellite receiver, such as a GNSS receiver. For example, for a navigation satellite receiver to determine its position, the satellite navigation receiver may determine the ranges to multiple satellites as well as their positions at time of transmitting. Knowing the satellites' orbital parameters, these positions may be calculated for any point in time. The pseudoranges of each satellite may be obtained by multiplying the speed of light by the time the signal has taken from the satellite to the receiver.

Figure 7:
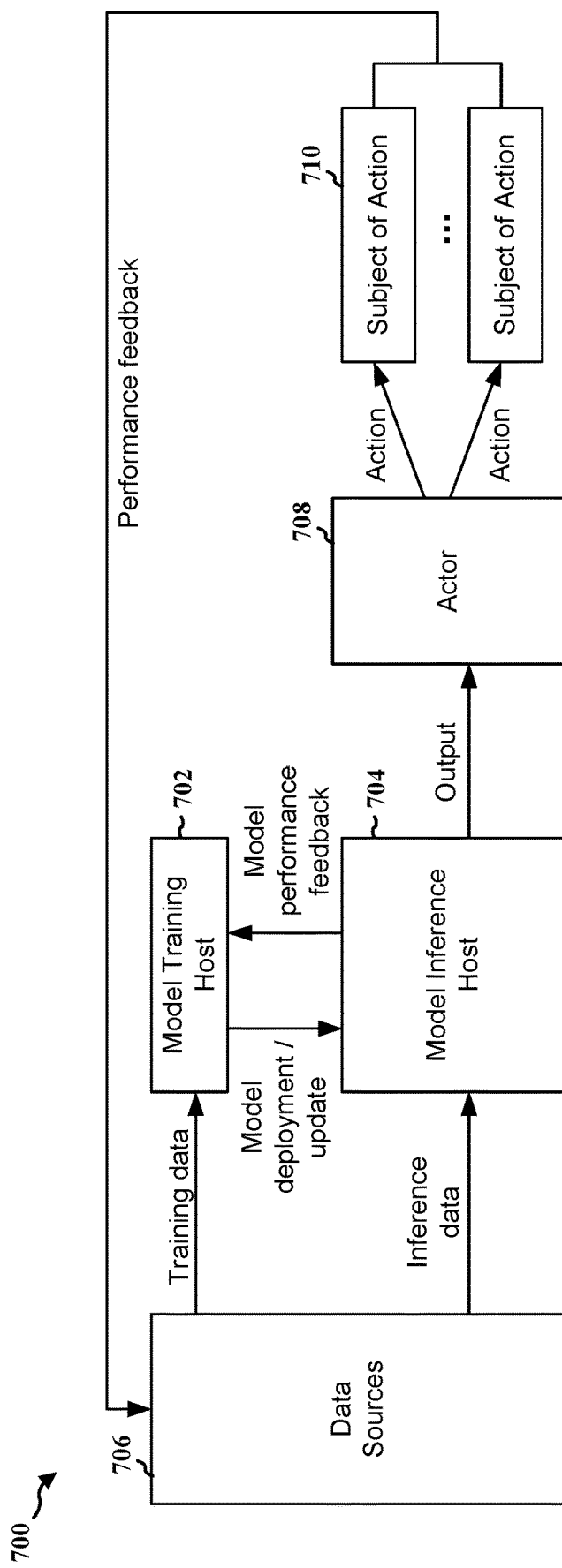
FIG. 7 is a diagram illustrating an example architecture of a functional framework for RAN intelligence enabled by data collection in accordance with various aspects of the present disclosure.

FIG. 7 is a diagram 700 illustrating an example architecture of a functional framework associated with an ML model (which may also be referred to as an ML classifier) in accordance with various aspects of the present disclosure. In some scenarios, the functional frame work for an ML model may be enabled by further enhancement of data collection through uses cases and/or examples. In one example, as shown by the diagram 700, a functional framework for the ML model may include multiple logical entities, such as a model training host 702, a model inference host 704, data sources 706, and/or an actor 708, etc. In some examples, multiple logical entities may be co-located on the same device (e.g., a UE, a positioning device, etc.) or a network node (e.g., a base station, a component of the base station, a server, etc.). In other examples, different logical entities may be located at different devices or network nodes.

The model inference host 704 may be configured to run an ML model based on inference data provided by the data sources 706, and the model inference host 704 may produce an output (e.g., a prediction) with the inference data input to the actor 708. The actor 708 may be a device or an entity. For example, the actor 708 may be a GNSS device or a location server associated with the GNSS device, etc. In addition, the actor 708 may also depend on the type of tasks performed by the model inference host 704, type of inference data provided to the model inference host 704, and/or type of output produced by the model inference host 704, etc.

After the actor 708 receives an output from the model inference host 704, the actor 708 may determine whether or how to act based on the output. For example, if the actor 708 is a location server and the output from the model inference host 704 is associated with PR measurement classification, the actor 708 may determine how to classify one or more PR measurements performed based on the output. Then, the actor 708 may indicate the classification to at least one subject of action 710. In some examples, the actor 708 and the at least one subject of action 710 may be the same entity (e.g., the GNSS device). For example, if the actor 708 (e.g., a location server) provides classification and/or weighting for certain PR measurements performed by a subject of action 710 (e.g., a GNSS device), the actor 708 may transmit a PR classification/weighting configuration to the subject of action 710. In response, the subject of action 710 may apply the classification/weighting configuration to its PR measurements.

The data sources 706 may also be configured for collecting data that is used as training data for training the ML model or as inference data for feeding an ML model inference operation. For example, the data sources 706 may collect data from one or more GNSS devices or location servers, which may include the subject of action 710, and provide the collected data to the model training host 702 for ML model training. For example, after a subject of action 710 (e.g., a GNSS device) receives a PR measurement classification/weighting configuration from the actor 708 (e.g., a location server), the subject of action 710 may provide performance feedback associated with the PR measurement classification/weighting configuration to the data sources 706, where the performance feedback may be used by the model training host 702 for monitoring or evaluating the ML model performance, e.g., whether the output (e.g., prediction) provided by the actor 708 is accurate. In some examples, if the output provided by the actor 708 is inaccurate (or the accuracy is below an accuracy threshold), the model training host 702 may determine to modify or retrain the ML model used by the model inference host, such as via an ML model deployment/update.

In one aspect of the present disclosure, an ML model is provided to classify GNSS PR measurements in terms of relative NLOS error based on SV geometry. As such, the classification provided by the ML model may enable a positioning device (e.g., a GNSS device) or a positioning server to determine a more suitable weighting of each PR measurement in GNSS position estimators, which may include position estimation based on weighted least squares (WLS) (e.g., a generalization of ordinary least squares and linear regression in which knowledge of the variance of observations is incorporated into the regression) and/or based on Kalman filter (KF) (e.g., an algorithm that uses a series of measurements observed over time, including statistical noise and other inaccuracies, and produces estimates of unknown variables that tend to be more accurate than those based on a single measurement alone, by estimating a joint probability distribution over the variables for each timeframe). In one example, the training of the ML model may be based on PR error estimates (e.g., the data sources 706) provided by a higher performance positioning device, such as an atomic clock accurate hardware. An atomic clock may refer to a clock that measures time by monitoring the frequency of radiation of atoms based on atoms having different energy levels.

Figure 8A:
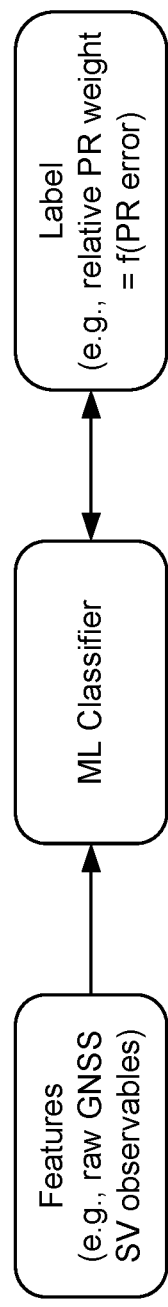
FIG. 8A is a diagram illustrating an example machine learning (ML) training for an ML classifier that is capable of classifying GNSS pseudorange (PR) measurements in accordance with various aspects of the present disclosure.

FIG. 8A is a diagram 800A illustrating an example ML training for an ML model that is capable of classifying GNSS PR measurements (e.g., in terms of relative NLOS error) in accordance with various aspects of the present disclosure. In one example, the training of an ML model may be performed offline at an ML workstation/server. For example, a model training host (e.g., the model training host 702) may receive features from a data source (e.g., the data sources 706), such as a higher performance positioning device with atomic clock accurate hardware or an end user device (e.g., the actor 708 and/or the subject of action 710), for training an ML model for classifying GNSS PR measurements in terms of relative NLOS error (may be referred to as an "ML classifier" or a "weight based ML classifier" hereafter) as signals received by a GNSS device via an NLOS path may include more errors and/or higher delays compared to signals received via an LOS path. In one example, the features used for training the weight based ML classifier may include raw GNSS SV observables (e.g., raw GNSS measurements), such as carrier-to-noise ratio (C/No), elevation/azimuth angle, auto-correlation function (ACF), code-carrier phase consistency, measurement status and error flags from hardware and measurement engine, consistency check between different frequency bands measurements (e.g., between L1 band and L5 band measurements) from the same SV, weighted least squares a-posteriori residuals, and/or signal (energy) integration information for each SV measurement (e.g., duration, mode, etc.), etc. Then, based on the features collected from a plurality of SVs, the model training host may be configured to derive a relationship between the plurality of SVs for the weight based ML classifier. For example, the relationship may be based on the SV geometry, such as geometric orientation of a set of SVs with respect to a GNSS device, where the geometric orientation may be a function of at least an azimuth angle (or an elevation angle) and a zenith angle between the GNSS device and a corresponding SV of the set of SVs.

Figure 9:
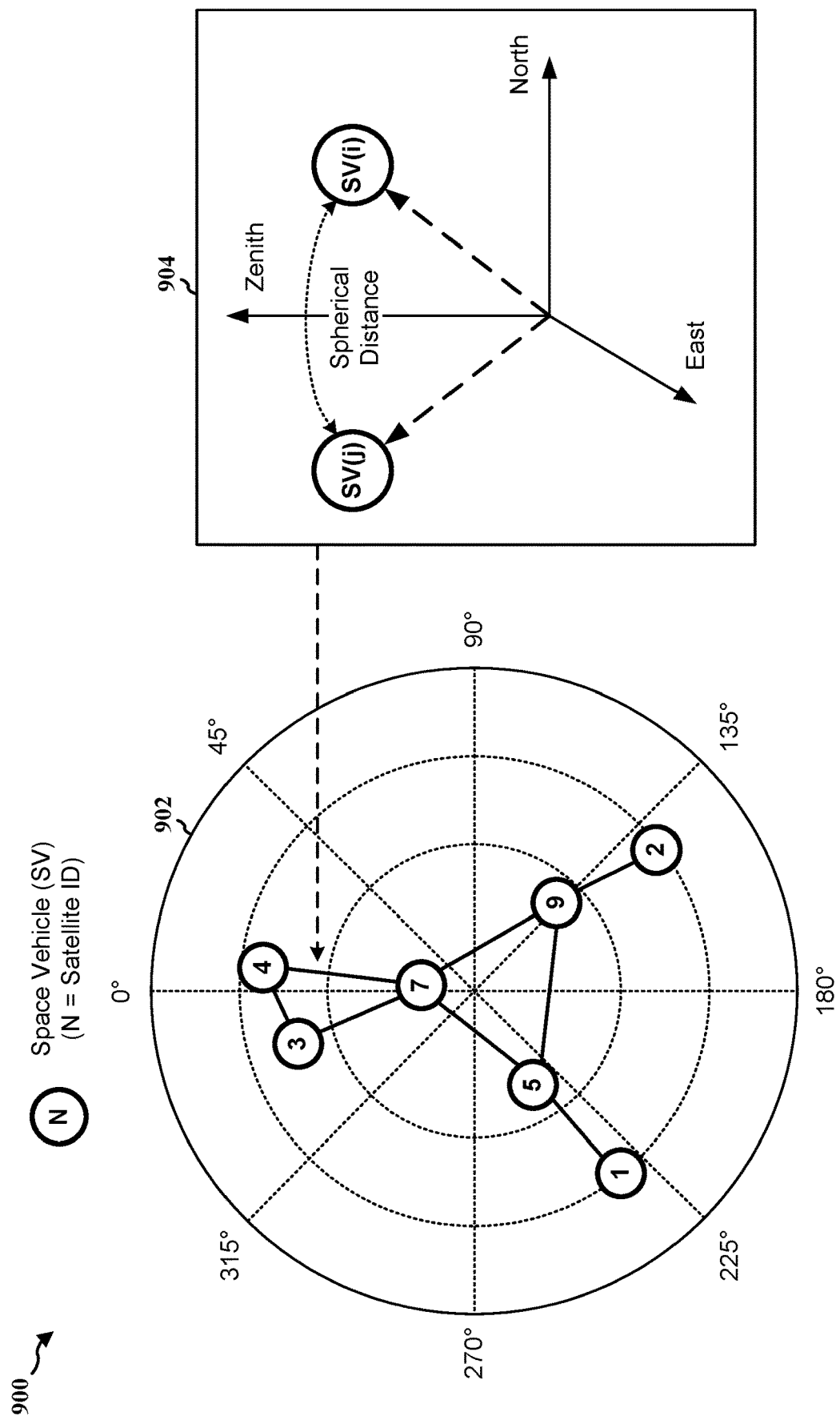
FIG. 9 is a diagram illustrating an example space vehicle (SV) geometry in accordance with various aspects of the present disclosure.

FIG. 9 is a diagram 900 illustrating an example SV geometry in accordance with various aspects of the present disclosure. In one example, the training of the weight based ML classifier may be based on the geometry of SVs, such as based on the spherical distance between SVs with respect to a ground point (e.g., observed/measured by an GNSS device). For example, the graph shown at 902 is an example skyplot of a plurality of SVs observed by a GNSS device at a ground point (e.g., SV locations relative to the GNSS device). The skyplot may provide an illustration of SV trajectories over a given ground site and/or the spherical distance between SVs. As shown at 904, the spherical distance between two SVs (e.g., SV(j) and SV(i)) may refer to a distance along a great circle of the two SVs.

In one aspect of the present disclosure, if the spherical distance between two SVs are below a distance threshold (e.g., the distance between two SVs is low), there may be a correlation (in terms of measurements) between the two SVs from at least the perspective of a GNSS device. For example, as shown at 902, as SV3 and SV4 are closer to each other compared to other SVs (e.g., SVs 1, 2, 5, 7, and 9, etc.), signals measured from SV3 and SV4 are likely to share some common conditions (e.g., LOS condition, NLOS condition, etc.) and/or errors (e.g., ionospheric/tropospheric errors). As such, measurements (e.g., the features/raw measurements) of SV3 may be used to assist measurements of SV4 and vice versa. For example, if a GNSS device measures signals from SV3 and derives a set of errors associated with SV3, the GNSS device may be configured to assume the same set of errors are also applicable to signals from SV4. In another example, if a GNSS device receives signals from SV4 via an NLOS path, the GNSS device may also assume that the signals received from SV3 are based on an NLOS path. As such, referring back to FIG. 8A, based at least in part on the geometry between SVs and features (e.g., raw GNSS SV observables) obtained from the SVs, the weight based ML classifier may be trained to provide a relative weight for a PR measurement from an SV based on measurements from one or more other SVs, and the weight based ML classifier may do the same for all PR measurements from multiple SVs to provide relative weights for these PR measurements (which also may be referred to as relative PR weight). For example, as SVs that are closer to each other may have similar errors, the relative PR weight may be configured to a function associated with the errors (which may be referred to as PR errors). As such, a weight based ML classifier may be trained to classify the likelihood of LOS and/or NLOS conditions, where PR measurements that may be based on NLOS condition may be provided with a lower weight compared to PR measurements that are based on LOS condition. In other words, the relative PR weight for one SV in a set of SVs may be based on a spherical distance between the one SV and each SV of at least a subset of the set of SVs, and the spherical distance between the one SV and an other SV may be based on the geometric orientation of the one SV compared to the geometric orientation of the other SV. In addition, the relative PR weight for one SV of the set of SVs may be further based on one or more of a carrier-to-noise ratio, an auto-correlation function, a code-carrier phase consistency, measurement status or error flags, consistency between different band measurements of the one SV, weighted least squares a-posteriori residuals, and/or signal integration information, etc.

In one example, the weight based ML classifier may be trained based on a graph convolutional network (GCN). GCN is a type of convolutional neural network (CNN) that is capable of working directly on graphs and take advantage of their structural information. GCN may be employed to classify nodes in a graph, where labels may be available for a small subset of nodes. For example, as shown by the diagram at 902 of FIG. 9, each SV in a skyplot may be represented by a node in GCN, and two nodes (e.g., two SVs) may be connected to each other if their spherical distance is below a distance threshold. For example, SV 3 may be connected to SVs 4 and 7, SV 7 may be connected to SVs 3, 4, 5, and 9, and SV 1 may be connected to SV 5, etc. As such, it may be assumed that each node may have some relationship with the other nodes in the graph, represented in the edge connection and edge weight (spherical distance between SVs). Each connected node may provide additional information to each other by sharing their respective node features, through an neighbor node aggregate method (which may be referred to as 'message-passing'). There may also be other variants and alternatives to message-passing.

Figure 10:
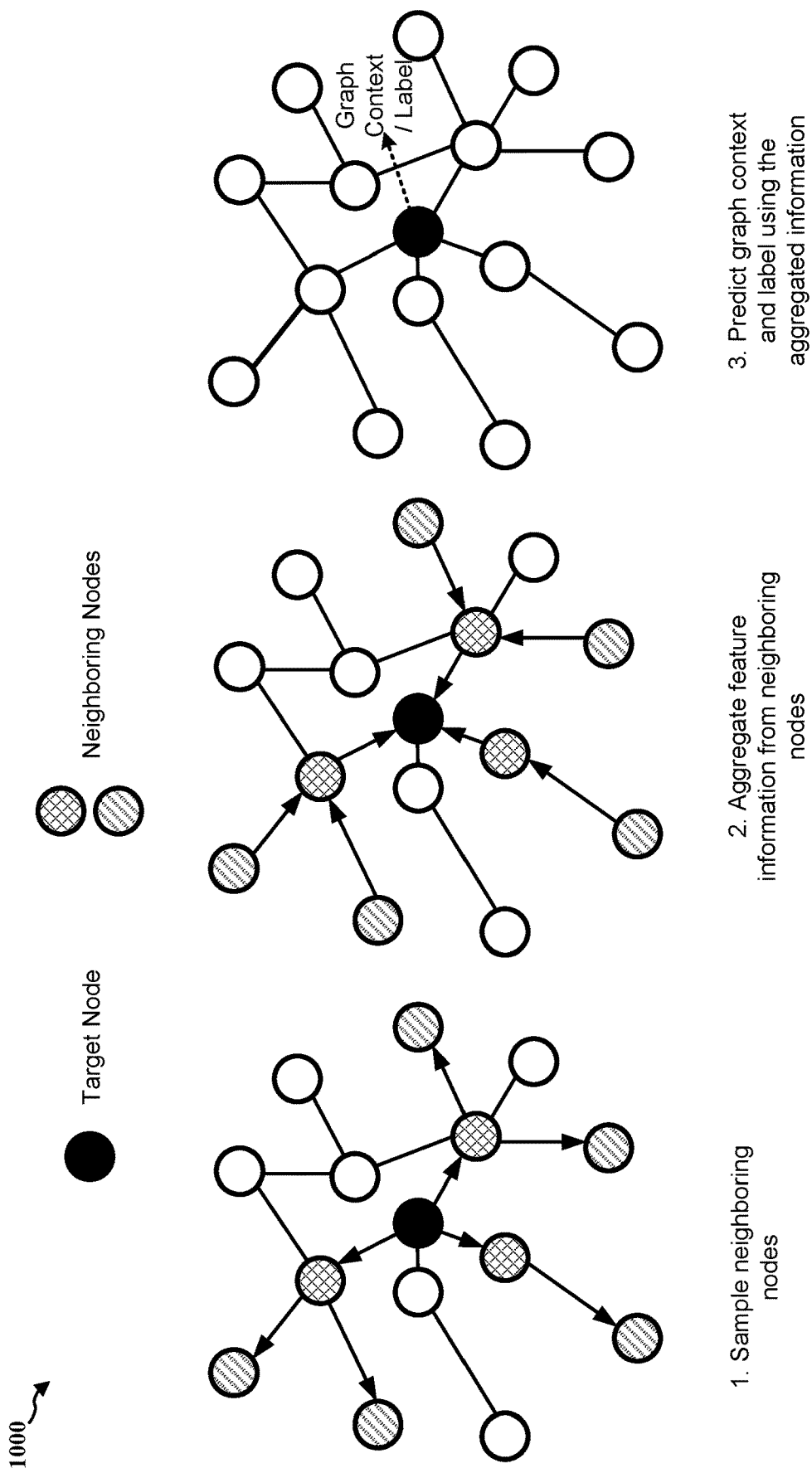
FIG. 10 is a diagram illustrating an example ML training based on a graph convolutional network (GCN) in accordance with various aspects of the present disclosure.

FIG. 10 is a diagram 1000 illustrating an example ML training based on a GCN in accordance with various aspects of the present disclosure. A target node may use aggregated neighborhood node features to make a prediction via the neural network, which may be a task like node classification, or structure/context determination. For example, during an ML training, the target node (e.g., a target SV) may first sample neighboring nodes (e.g., other SVs) for candidate nodes (e.g., SVs with spherical distance below a threshold). Then, the target nodes may aggregate feature information (e.g., raw GNSS SV observables) from these candidate nodes, and the target node may predict a graph context and label based on the aggregated feature information. In other words, a graph may be constructed to represent SV measurements based on their geometry (e.g., skyplot), then a graph neural network (GNN) (e.g. GCN) and GNN-like ML methods (e.g., non-seasonal variation (NSV), multilayer perceptron (MLP)) may be constructed to effectively use neighbor SV measurements to aid in main SV classification.

Figure 8B:
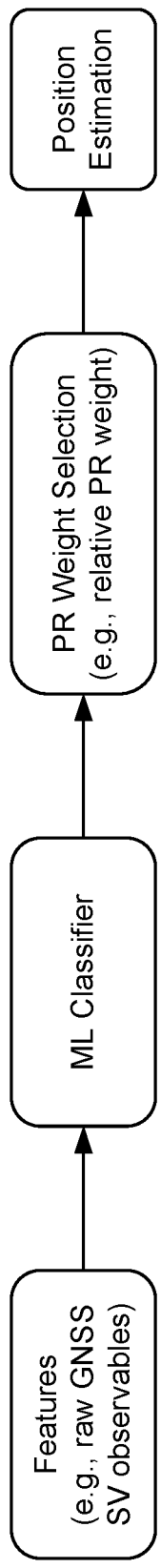
FIG. 8B is a diagram illustrating an example ML inferencing for an ML classifier that is capable of classifying GNSS PR measurements in accordance with various aspects of the present disclosure.

FIG. 8B is a diagram 800B illustrating an example ML inferencing for an ML model that is capable of classifying GNSS PR measurements in accordance with various aspects of the present disclosure. After the weight based ML classifier discussed in connection with FIG. 8A is trained, a GNSS device or a location server may use the weight based ML classifier for classifying PR measurements from different SVs. For example, a GNSS device may measure PR for a plurality SVs, and the weight based ML classifier may provide a relative PR weight for each PR measured. For example, referring to the diagram at 902 of FIG. 9, a GNSS device may measure PRs for SVs 1, 2, 3, 4, 5, 7, and 9, and the weight based ML classifier may provide a PR weight for each of the PR measurements from each SV based on measurements from other SVs. Then, the GNSS device may perform position estimation based on the weighted PR measurements, which may provide a higher positioning accuracy compared to non-weighted PR measurements. As such, by using accurate PR error label (e.g., obtained from a third party truth position device and atomic clock reference) to construct the label data for ML training, an ML model may construct a classification label data based on the PR error label, such as based on combination of absolute PR error and relative difference within a given fix epoch (a graph). An epoch may refer to a moment in time used as a reference point for some time-varying astronomical quantity.

In another aspect of the present disclosure, to enable deployment of aspects presented herein on GNSS devices with lower computational resources, the weight based ML classifier may be trained and provide inference based on non-seasonal variation (NSV) and/or multilayer perceptron (MLP), which may reduce the complexity of the ML training and/or ML inferencing with performance/accuracy of the positioning slightly reduced. MLP may refer to a neural network where the mapping between inputs and output may be non-linear. For example, an MLP may be a class of feedforward artificial neural network (ANN), which may refer to networks composed of multiple layers of perceptron (with threshold activation). An MLP may include at least three layers of nodes: an input layer, one or more hidden layers, and an output layer. Except for the input nodes, each node may be a neuron that uses a nonlinear activation function. The inputs may be combined with initial weights in a weighted sum and subjection to the activation function. Then, each layer (starting from the input layer) may feed the next layer with the result of their computation and/or internal representation of the data, which may go through all the way to the output layer. In some examples, the MLP may utilize a supervised learning technique called backpropagation for training. Backpropagation may refer to a learning mechanism that allows the MLP to iteratively adjust the weights in the network, with the goal of minimizing the cost function. An output may be generated from multiple inputs based on MLP.

Figure 11:
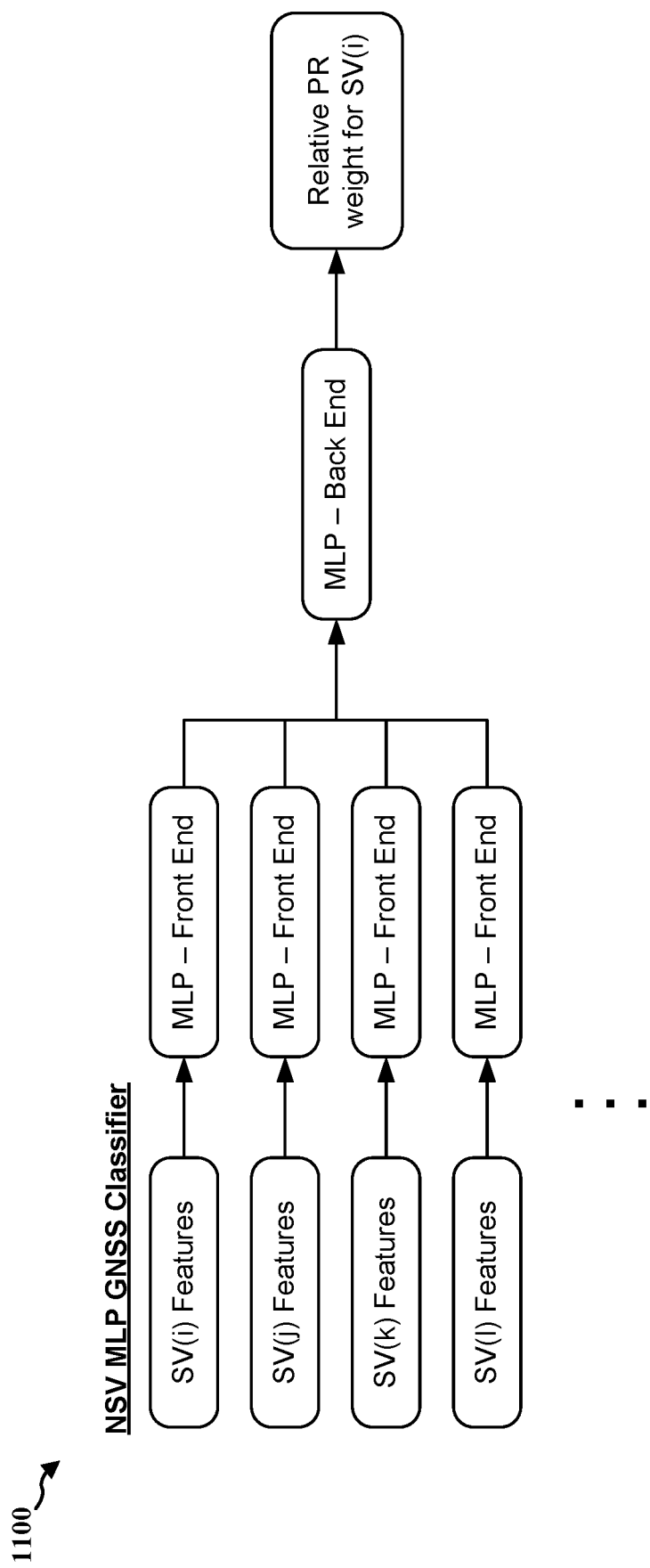
FIG. 11 is a diagram illustrating an example architecture of GCN classifier based on multilayer perceptron (MLP) in accordance with various aspects of the present disclosure.

FIG. 11 is a diagram 1100 illustrating an example architecture of GCN classifier based on MLP in accordance with various aspects of the present disclosure. For a weight based ML classifier based on MLP, features from multiple SVs may be provided to the front end of the MLP (e.g., the input layer of the MLP). Then, the features may be aggregated based on their weights through one or more hidden layers of the MLP to generate a relative PR weight for each SV (with respect to other SVs). For example, to determine the relative PR weight for SV(i), features (e.g., measurements) from SV(i) and other SVs (e.g., SV(j), SV(k), SV(l), . . . , etc.) may be provided to an MLP. Then, based on the ML training, a relative PR weight for SV(i) may be obtained. While the ML classifier based on the MLP may have a lower performance and accuracy compared to the ML classifier based on GCN, the performance trade-off may be acceptable in some scenarios as there may be a significant reduction in memory and CPU usage.

Figure 12:
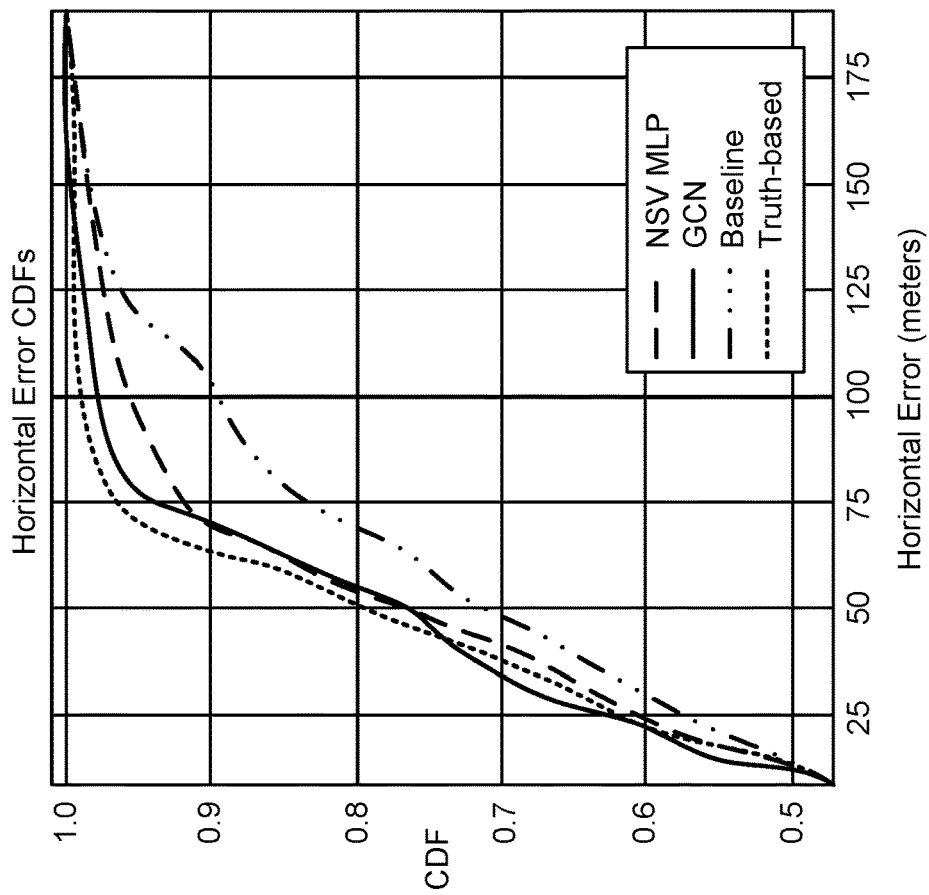
FIG. 12 is a diagram illustrating an example of horizontal error cumulative distribution functions (CDFs) for ML classifiers based on MLP and GCN in accordance with various aspects of the present disclosure.

FIG. 12 is a diagram 1200 illustrating an example of horizontal error cumulative distribution functions (CDFs) for ML classifiers based on MLP and GCN in accordance with various aspects of the present disclosure. The accuracy of a GNSS device may be measured based on a horizontal component (e.g., easting and northing) accuracy, which may be expressed by a circular error probable (CEP). A CEP may indicate that there is a 50% chance that the true horizontal position is located inside a circle of radius equal to the value of CEP. As shown by the diagram 1200, both an ML classifier based on GCN and an ML classifier based on MLP may provide better positioning performance compared to the baseline performance (e.g., without ML classifier/classification). While the ML classifier based on GCN may provide a better performance in terms of horizontal error compared to the ML classifier based on MLP (e.g., ML classifier based on GCN is closer to truth-based performance compared to the ML classifier based on MLP), the ML classifier based on MLP consumes relatively smaller memory (e.g., approximately 33 KB) compared to the ML classifier based on GCN (e.g., approximately 11.2 MB). As such, in some scenarios, the ML classifier based on MLP may be a more suitable choice for GNSS devices with less memory availabilities or for GNSS devices with reduced capabilities.

Figure 13:
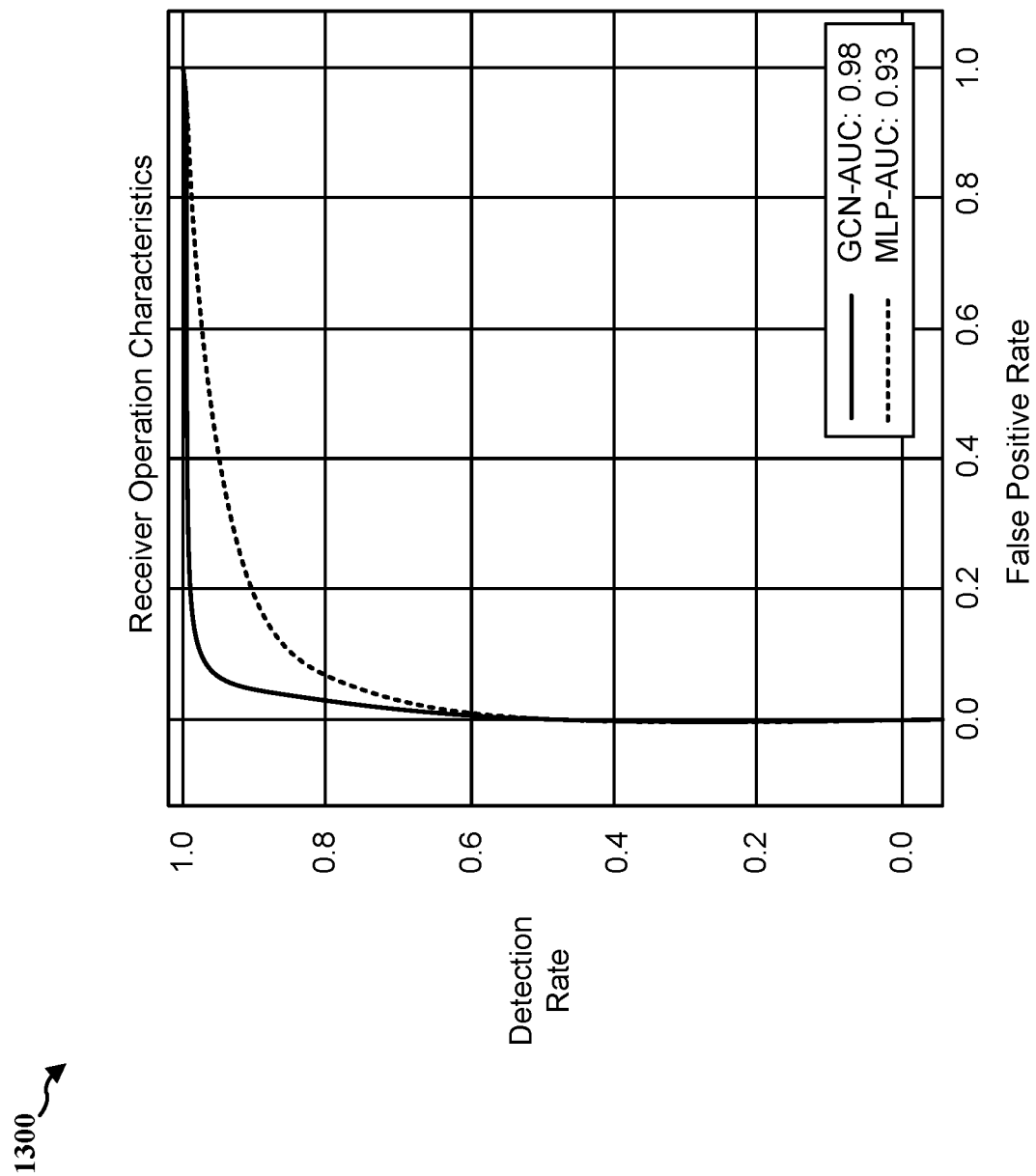
FIG. 13 is a diagram illustrating an example of receiver operation characteristics for ML classifiers based on MLP and GCN in accordance with various aspects of the present disclosure.

FIG. 13 is a diagram 1300 illustrating an example of receiver operation characteristics for ML classifiers based on MLP and GCN in accordance with various aspects of the present disclosure. The diagram 1300 illustrates the performance of ML classifiers based on MLP and GCN in terms of receiver operation characteristics based on the area under the curve (AUC). AUC is a measure of the ability of a classifier to distinguish between classes. In general, the higher the AUC, the better the performance of the model at distinguishing between the positive and negative classes. As illustrated by the diagram 1300, ML classifier based on GCN may provide a better performance in terms of receiver operation characteristics compared to the ML classifier based on MLP. Thus, in some scenarios, the ML classifier based on GCN may be a more suitable choice for GNSS devices with sufficient memory availabilities or for GNSS devices that specify higher positioning accuracy and/or speed.

In another aspect of the present disclosure, a position-grid based ML classifier is provided to a GNSS device to improve the accuracy of identifying a warm-start position of the GNSS device. The warm start of a GNSS device may refer to a scenario where the GNSS device remembers its last calculated position or is able to estimate its initial position (e.g., based on location of the serving base station or an access point), almanac used, and UTC Time, but not which SVs were in view. The GNSS device may then perform a reset and attempt to obtain the SV GNSS signals and calculate a new position. The GNSS device may have a general idea of which SVs to look for based on the last known position and the almanac data may help the GNSS device to identify which satellites are visible in the sky. This process may take some time.

In one aspect, a GNSS device may be configured to estimate its initial position and establish a position-grid with a fixed resolution (e.g., with multiple grid points) that covers a region of position uncertainty based on the estimated initial position. Then, the GNSS device may compute per SV PR measurement residuals at each grid point of the position-grid. A position-grid based ML classifier may be trained to process per SV GNSS observables and PR measurement residuals obtained by the GNSS device to infer/predict the probability of whether a grid point is near the actual position of the GNSS device. For example, the position-grid based ML classifier may be trained based on PR error estimates derived from atomic clock accurate hardware and/or the known distance between the GNSS device position and the grid point position, and the position-grid based ML classifier may estimate the GNSS device location using the distribution of grid point probabilities across the position-grid.

Figure 14:
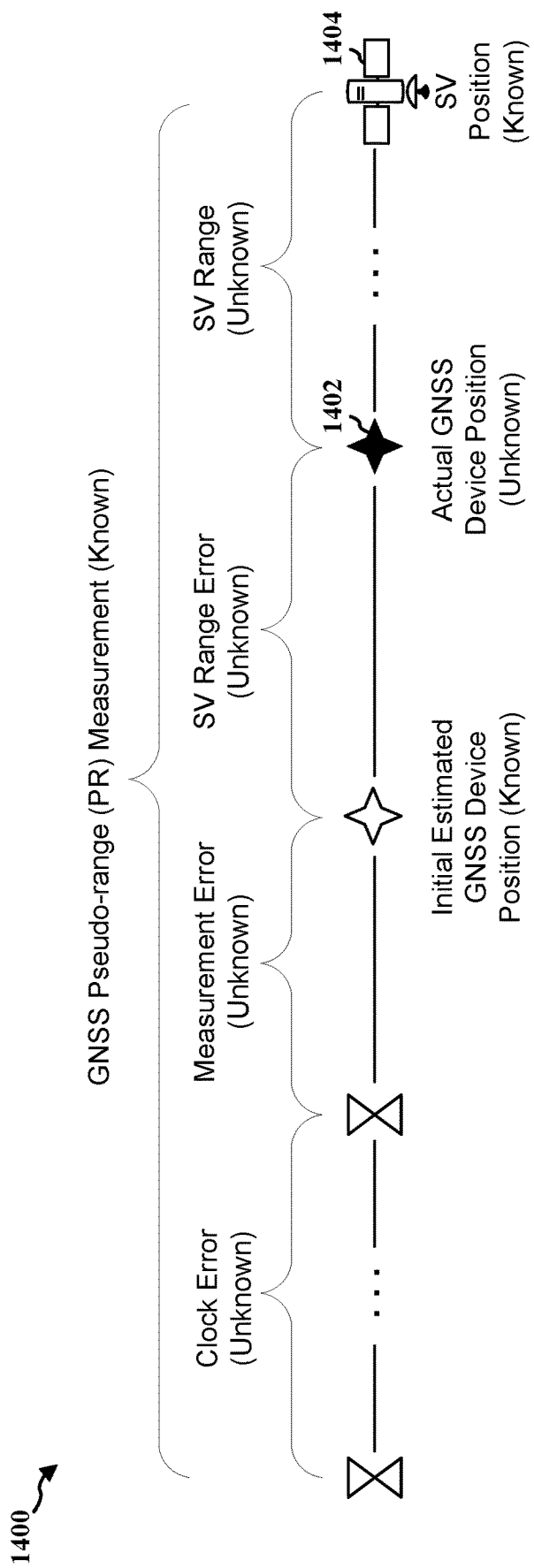
FIG. 14 is a diagram illustrating an example of known and unknown parameters for a GNSS device during a warm start in accordance with various aspects of the present disclosure.

FIG. 14 is a diagram 1400 illustrating an example of known and unknown parameters for a GNSS device during a warm start in accordance with various aspects of the present disclosure. During a warm start of a GNSS device 1402, the GNSS device 1402 may be able to identify: (1) GNSS PR Measurement: raw range measurement obtained from GNSS measurement engine (e.g., based on local GNSS arrival time minus GNSS transmit time); (2) SV Position: position of an SV 1404, derived from ephemeris or XTRA; and (3) Initial Estimated GNSS Device Position: initial position of the GNSS device 1402 used for the fixed location calculation. On the other hand, the GNSS device 1402 may not be able to identify one or more of the followings: (a) Actual GNSS Device Position: actual position of the GNSS device 1402; (b) SV Range: distance from the position of the SV 1404 to the position of the GNSS device 1402, which may be unique to each individual SV; (c) SV Range Error: Error in SV range as computed based on the Initial Estimated GNSS Device Position and the SV Position, which may be unique to each individual SV (e.g., typical errors are −1 km to +1 km); (d) Measurement Error: error in the measurement due to noise and/or excess delay (e.g., typical noise error=+/−10 m, and typical excess delay error=+20 m to +300 m); and/or (e) Clock Error: error in GNSS time determined from the local receiver clock, which may be common to all PR measurements in the same epoch (e.g., typical clock error is −10 km to +10 km). As such, in order to determine the SV range, the GNSS device 1402 may be specified to solve or determine the three sources of error (e.g., the clock error, the noise error, and the excess delay error).

For example, to determine the SV range error, the GNSS device 1402 may be configured to differentiate whether a measurement error includes both the noise error and the excess delay error (referring as "case A" hereafter), or the measurement error includes the noise error without the excess delay error (referring as "case B" hereafter). Case A measurements are more likely to associated be with NLOS measurements (e.g., GNSS signals are received based on NLOS condition or multipaths) as they include excess delay error, whereas case B measurements are more likely to be associated with LOS measurements (e.g., GNSS signals are received based on LOS condition) as they do not include excess delay error (thus providing a better distance estimation). In some examples, knowledge of the clock error may be skipped as the clock error may be common to all PR measurements. In some scenarios, for a set of N PR measurements (e.g., typically N=15 to 50), the initial estimated GNSS device position (and therefore the SV range error) may constantly be changed to make case A measurements appear like case B measurements and vice versa. As such, in one aspect of the present disclosure, an ML classifier (which may be referred to as a "position-grid based ML classifier" hereafter) may be trained to classify whether PR measurements are associated with case A or case B because typically there may be a subset of case A measurements among the N PR measurements and the measurement error may be specified to be modeled accurately. For example, the position-grid based ML classifier may be trained to initially differentiate case A from case B for the GNSS device 1402, and then the GNSS device 1402 may be able to estimate a more accurate clock error and receiver position. In other words, if the position-grid based ML classifier works properly, the measurement errors post-computed with the estimated clock error and the actual receiver position may either be noise error or excess delay error plus noise error (e.g., no measurement error may indicate early arrival).

Figure 15:
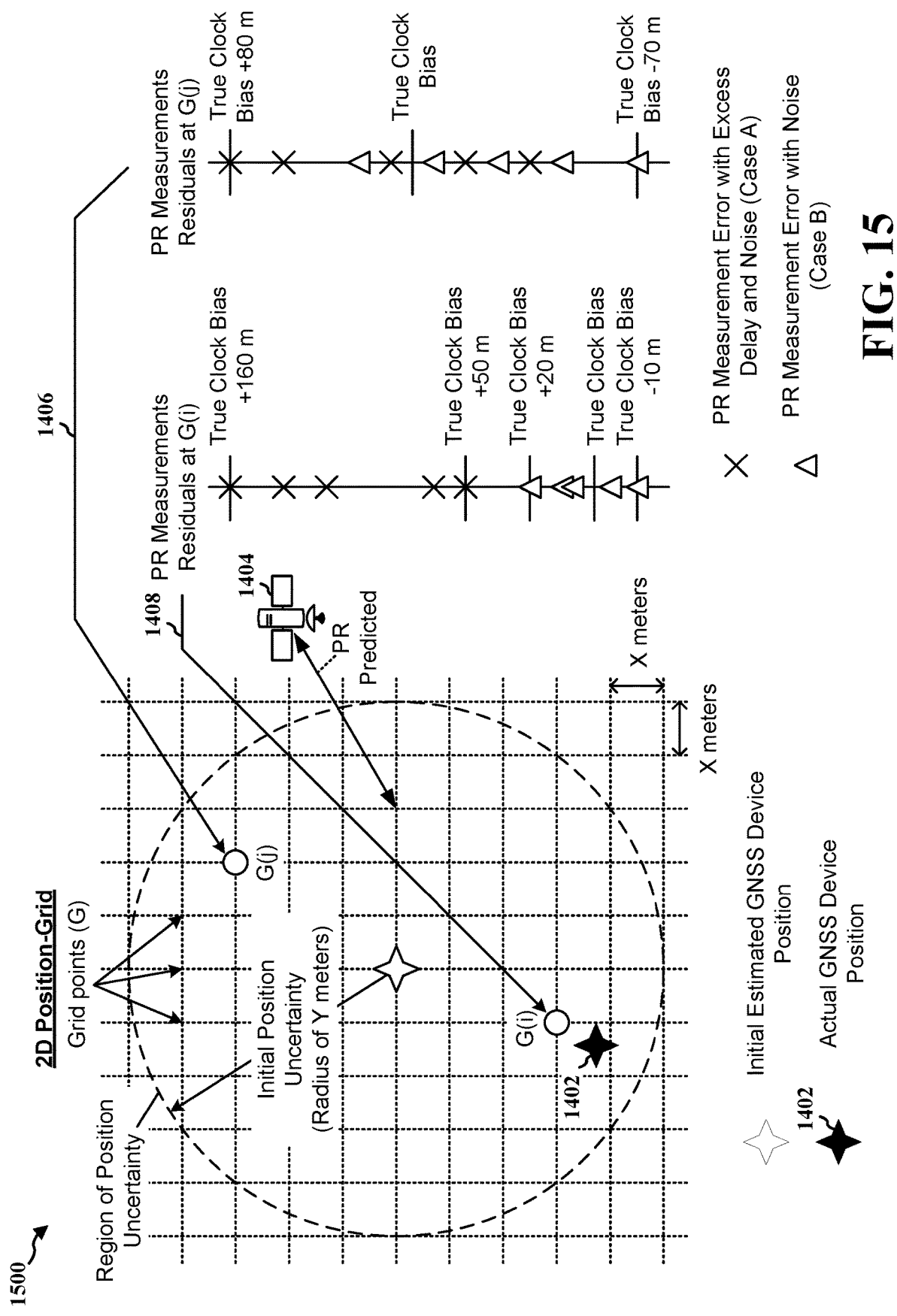
FIG. 15 is a diagram illustrating an example of identifying a position of a GNSS device based on a position-grid approach in accordance with various aspects of the present disclosure.

FIG. 15 is a diagram 1500 illustrating an example of identifying a position of a GNSS device (e.g., the GNSS device 1402) based on a position-grid approach in accordance with various aspects of the present disclosure. In one example, during a warm start, the GNSS device 1402 may be configured to define a two-dimensional (2D) rectangular position grid, centered approximately at the initial estimated GNSS device position with grid points spaced at a defined distance (e.g., X m apart). The GNSS device 1402 may be specified to consider just the grid points that fall within a region of position uncertainty (e.g., a circular region) defined by an initial position uncertainty (e.g., within a radius of Y meters from the initial estimated GNSS device position).

Then, for each grid point (G) within the position-grid, the GNSS device 1402 may compute the PR measurement residuals for the set of PR measurements available at the current epoch, where a PR measurement residual may equal to a difference of a PR measurement minus a predicted PR (e.g., PR Measurement Residual=PR Measurement−PR Predicted, where PR Predicted=range of G to SV 1404 and certain correction factors may be excluded for simplicity). The PR measurement residuals measured at a grid point may provide how PR measurement residuals would look at that grid point if the GNSS device 1402 is at that grid point. For example, assuming there is a total of ten (10) PR measurements (e.g., measured from ten SVs) that include five (5) case A measurements (e.g., PR measurements including excess delay error and noise error) and five (5) case B measurements (e.g., PR measurements including just noise error), which may be differentiated by the GNSS device 1402 based on a trained position-grid based ML classifier. As shown at 1406, when a grid point (e.g., grid point G(j)) that is used for calculating the PR measurement residuals is further away from the actual GNSS device position (e.g., nine grid spacing away), case A measurements and case B measurements may tend to distribute randomly across the early points and late points of the distribution. On the other hand, as shown at 1408, when a grid point (e.g., grid point G(i)) that is used for calculating the PR measurement residuals is closer to the actual GNSS device position (e.g., one grid spacing away), case B measurements may be distributed/clustered at the earliest extent of the distribution, while case A measurements may be uniformly distributed at later points of the distribution. In other words, based on the distribution of case A and case B measurements, the GNSS device 1402 may estimate its actual position more quickly and accurately. In other words, the GNSS device 1402 is more likely to locate approximate (e.g., close) to grid points with case A and case B measurements distributed as shown at 1408, and less likely to locate approximate to grid points with case A and case B measurements distributed as shown at 1406.

When a measured grid point (e.g., G(i)) is closer to the truth position of the GNSS device 1402, good PR measurement residuals (e.g., measurements without excess delay) are likely to distribute/cluster on the early side of the distribution because the nature of the GNSS reflections is a delay, which may be random (e.g., it is a function of how SV signals reflected on the buildings and other obstacles). Thus, if a grid point is approximate (or close) to the truth position of the GNSS device 1402, there is a signature where the good measurements (e.g., case B measurements) are distributed/clustered in an early portion of a distribution and the not good measurements (e.g., case A measurements) are distributed/clustered in a later portion of the distribution as they are delayed. Such clustering associated with G(i) is due to the estimated PR, which is a function of G(i), being closer to the measured PR (e.g., the truth position of the GNSS device 1402). However, if a measured grid point is not approximate to the truth position of the GNSS device, the case A measurements and the case B measurements are likely to be jumbled because errors between this measured grid point and the truth location of the GNSS may also be random. As there are basically two sources of error, one is due to the reflection (e.g., the NLOS condition) and the other one is the error for the GNSS device position, they both may be projected in the prediction of the distance to the satellite. Thus, the two sources of errors may constructively or destructively interfere with each other, thereby creating the distribution/clustering pattern as shown at 1406. Such clustering associated with G(j) is due to the estimated PR, which is a function of G(j), being further from the measured PR (e.g., the truth position of the GNSS device 1402).

Similarly, in another aspect of the present disclosure, an ML classifier (e.g., an additional ML classifier or the position-grid based ML classifier) may be trained to identify whether a grid point is approximate to the actual position of the GNSS device 1402, and thereby estimating the actual location of the GNSS device 1402. For example, a position-grid based ML classifier may be trained to first identify whether PR measurements from multiple SVs at an epoch are case A measurements or case B measurements, and then the position-grid based ML classifier may determine the probability of whether a grid point is approximate to the actual position of the GNSS device 1402 based on the clustering/distribution patterns of the case A and case B measurements. Based on identifying the likelihood of whether each of the grid points within the region of position uncertainty is approximate to the GNSS device 1402, the GNSS device 1402 may create a 2D heat map that shows the probabilities (e.g., in terms of percentage such as 50% or 75%) or the likelihoods (e.g., in terms relative comparison such as low, medium and high) of whether the grid points are close to the actual position of the GNSS device 1402.

Figure 16:
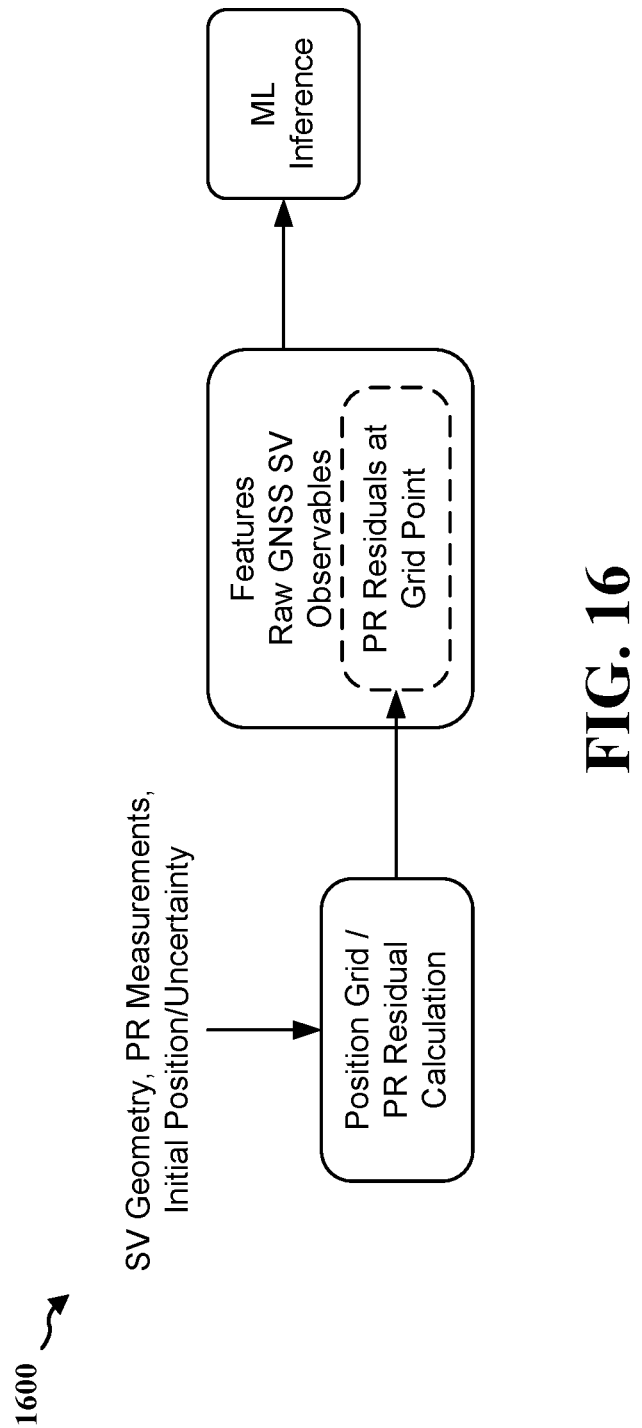
FIG. 16 is a diagram illustrating an example ML model for inferencing whether a grid point is approximate to an actual position of a GNSS device in accordance with various aspects of the present disclosure.

FIG. 16 is a diagram 1600 illustrating an example position-grid based ML classifier for inferencing whether a grid point is approximate to an actual position of a GNSS device in accordance with various aspects of the present disclosure. A position-grid based ML classifier may use all available information for training and inference. For example, the position-grid based ML classifier may use measurement error for all PR measurements and/or actual GNSS device position as labels, and use GNSS measurement observables for each SV (e.g., C/No, code/carrier consistency, carrier phase availability, weighted least squares a-posteriori residuals, etc.), geometric relation between SVs (e.g. spherical distance as described in connection with FIG. 9), and/or distribution of PR measurements residuals computed at a grid point as features for ML training and inferencing. For example, the position-grid based ML classifier may be trained based on a multiclass GCN for estimating weight probabilities for all SVs. Then, another per grid point ML classifier may further be trained to receive weight probabilities for each SV and/or PR measurement residual for each SV as features, and to generate a label for a grid point based on the grid spacing between the grid point and the actual GNSS device position (e.g., TRUE if grid point is <=1 grid spacing away from actual GNSS device position and FALSE if grid point is >1 grid spacing away from actual GNSS device position, etc.). Thus, during the ML inference, the position-grid based ML classifier may compute a probability that each grid point is within 1 grid spacing away from the actual GNSS device position, and the position-grid based ML classifier may declare the location of the actual GNSS device position based on the 2D heat map of grid point probabilities.

In another aspect of the present disclosure, the likelihoods/probabilities of whether the grid points are approximate to the actual location of the GNSS receiver and/or the sets of PRs for each grid point (e.g., for case A measurements and case B measurements) may further be provided as features for the weight based ML classifier described in connection with FIGS. 8A, 8B, 9, 10, and 11, such that the weight based ML classifier may determine the weights for PR measurements from different SVs further based on the likelihoods/probabilities and/or sets of PRs for each grid point. Then, the GNSS device or a location server may determine or estimate the location of the GNSS device based on the weighted PR measurements, which may further enhance the accuracy of the GNSS device positioning.

In another aspect of the present disclosure, a first ML classifier (i.e., a weight based ML classifier) may determine the position of a GNSS device based on weighted PR measurements (e.g., as described in connection with FIGS. 8A, 8B, 9, 10, and 11) and a second ML classifier (i.e., a position-grid based ML classifier) may determine the position of the GNSS device based on grid points (e.g., as described in connection with FIGS. 14 to 16). Then, a third ML classifier may receive the determined positions of the GNSS device from both the first ML classifier and the second ML classifier, and the third ML classifier may weight the positions from the first and the second ML classifiers and provide an estimated GNSS device position based on the weighted positions.

Figure 17:
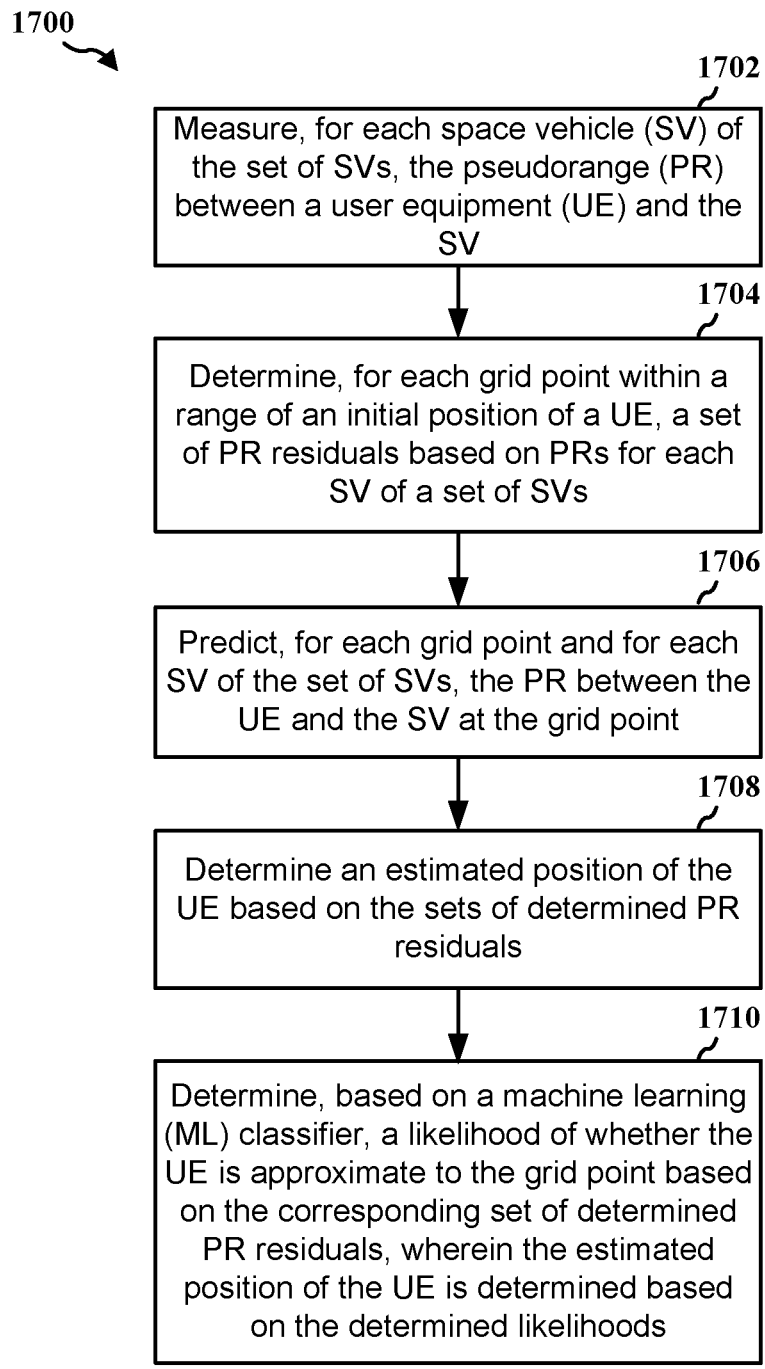
FIG. 17 is a flowchart of a method of wireless communication.

FIG. 17 is a flowchart 1700 of a method of position estimation. The method may be performed by a positioning device or a positioning entity (e.g., the UE 104; the base station 102; the GNSS device 506, 606, 1402; the apparatus 1904; the network entity 1902). The method may enable the positioning device (e.g., a UE) or the positioning entity (e.g., a location server) to estimate a warm start position of the positioning device based on a position-grid approach to improve the accuracy and speed of identifying the position of the positioning device.

At 1702, the positioning device or the positioning entity may measure, for each SV of a set of SVs, the PR between the positioning device and the SV, such as described in connection with FIG. 15. For example, a GNSS device 1402 (e.g., the positioning device) may measure, for each SV of a set of SVs, the PR between the GNSS device and the SV. The measurement of the PR may be performed by, e.g., the positioning ML component 198 of the apparatus 1904 and/or the positioning ML component 199 of the network entity 1902 in FIG. 19.

At 1704, the positioning device or the positioning entity may determine, for each grid point within a range of an initial position of a positioning device, a set of PR residuals based on PRs for each SV of a set of SVs, such as described in connection with FIG. 15. For example, the GNSS device 1402 may determine, for each grid point within a range of an initial position of the GNSS device 1402, a set of PR residuals based on PRs for each SV of a set of SV. The determination of the set of PR residuals may be performed by, e.g., the SPS module 1916/the positioning ML component 198 of the apparatus 1904, and/or the positioning ML component 199 of the network entity 1902 in FIG. 19.

In one example, the PRs may include a measured PR and a predicted PR, and each PR residual in the set of PR residuals may be a measure of a difference between the measured PR and the predicted PR.

At 1706, the positioning device or the positioning entity may predict, for each grid point and for each SV of the set of SVs, the PR between the positioning device and the SV at the grid point, such as described in connection with FIG. 15. For example, the GNSS device 1402 may predict, for each grid point and for each SV of the set of SVs, the PR between the GNSS device 1402 and the SV at the grid point. The determination of the relative PR weight may be performed by, the SPS module 1916/the positioning ML component 198 of the apparatus 1904 and/or the positioning ML component 199 of the network entity 1902 in FIG. 19. In such an example, each PR residual in the set of PR residuals may be determined based on a difference between the measured PR and the predicted PR.

At 1708, the positioning device or the positioning entity may determine an estimated position of the positioning device based on the sets of determined PR residuals, such as described in connection with FIG. 15. For example, the GNSS device 1402 may estimate a position of the positioning device based on the distribution of PR residuals. The estimation of the position of the positioning device may be performed by, e.g., the SPS module 1916/the positioning ML component 198 of the apparatus 1904, and/or the positioning ML component 199 of the network entity 1902 in FIG. 19.

At 1710, the positioning device or the positioning entity may determine, based on an ML classifier, a likelihood of whether the positioning device is approximate to the grid point based on the corresponding set of determined PR residuals, where the estimated position of the positioning device may be determined based on the determined likelihoods, such as described in connection with FIG. 15. The determination of the likelihood of whether the positioning device is approximate to the grid point may be performed by, e.g., the SPS module 1916/the positioning ML component 198 of the apparatus 1904, and/or the positioning ML component 199 of the network entity 1902 in FIG. 19.

In one example, the likelihood of whether the positioning device is approximate to the grid point may be classified by the ML classifier based on a distribution of PR residuals in each set of PR residuals.

In another example, the positioning device or the positioning entity may determine for each SV of the set of SVs at least a geometric orientation with respect to the UE, and determining, based on an ML classifier and the determined geometric orientation with respect to the UE for each SV of at least a subset of the set of SVs, a relative PR weight for each SV of the set of SVs, where the estimated position of the UE is further determined based on the relative PR weight for each SV of the set of SVs. In such an example, the geometric orientation may be a function of at least an azimuth angle and a zenith angle between the UE and a corresponding SV of the set of SVs. In such an example, the relative PR weight for one SV of the set of SVs may be based on a spherical distance between the one SV and each SV of the at least the subset of the set of SVs, the spherical distance between the one SV and an other SV being based on the geometric orientation of the one SV compared to the geometric orientation of the other SV. In such an example, the relative PR weight for one SV of the set of SVs may be further based on one or more of a carrier-to-noise ratio, an auto-correlation function, a code-carrier phase consistency, measurement status or error flags, consistency between different band measurements of the one SV, weighted least squares a-posteriori residuals, or signal integration information. In such an example, the relative PR weight may be based on a predicted relative PR error by the ML classifier.

Figure 18:
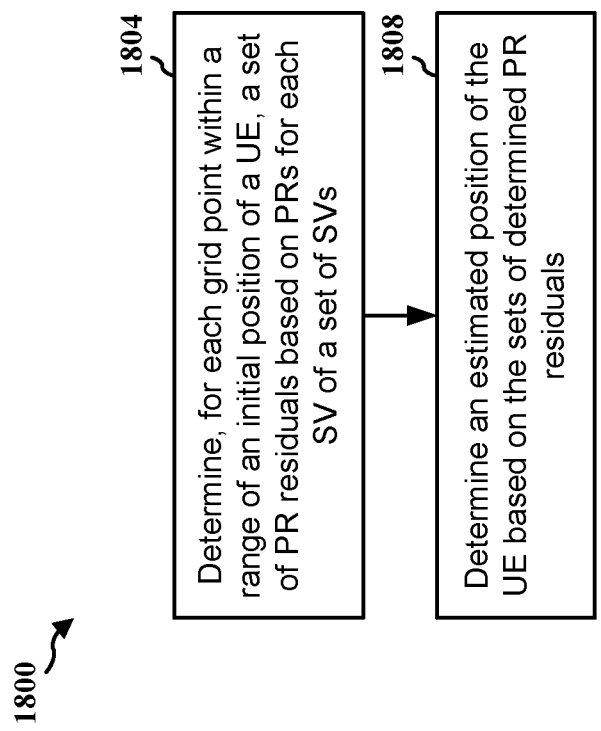
FIG. 18 is a flowchart of a method of wireless communication.

FIG. 18 is a flowchart 1800 of a method of position estimation. The method may be performed by a positioning device or a positioning entity (e.g., the UE 104; the base station 102; the GNSS device 506, 606, 1402; the apparatus 1904; the network entity 1902). The method may enable the positioning device (e.g., a UE) or the positioning entity (e.g., a location server) to estimate a warm start position of the positioning device based on a position-grid approach to improve the accuracy and speed of identifying the position of the positioning device.

At 1804, the positioning device or the positioning entity may determine, for each grid point within a range of an initial position of a positioning device, a set of PR residuals based on PRs for each SV of a set of SVs, such as described in connection with FIG. 15. For example, the GNSS device 1402 may determine, for each grid point within a range of an initial position of the GNSS device 1402, a set of PR residuals based on PRs for each SV of a set of SV. The determination of the set of PR residuals may be performed by, e.g., the SPS module 1916/the positioning ML component 198 of the apparatus 1904, and/or the positioning ML component 199 of the network entity 1902 in FIG. 19.

In one example, the positioning device or the positioning entity may measure, for each SV of a set of SVs, the PR between the positioning device and the SV, such as described in connection with FIG. 15. For example, a GNSS device 1402 (e.g., the positioning device) may measure, for each SV of a set of SVs, the PR between the GNSS device and the SV. The measurement of the PR may be performed by, e.g., the positioning ML component 198 of the apparatus 1904 and/or the positioning ML component 199 of the network entity 1902 in FIG. 19.

In another example, the positioning device or the positioning entity may predict, for each grid point and for each SV of the set of SVs, the PR between the positioning device and the SV at the grid point, such as described in connection with FIG. 15. For example, the GNSS device 1402 may predict, for each grid point and for each SV of the set of SVs, the PR between the GNSS device 1402 and the SV at the grid point. The determination of the relative PR weight may be performed by, the SPS module 1916/the positioning ML component 198 of the apparatus 1904 and/or the positioning ML component 199 of the network entity 1902 in FIG. 19. In such an example, each PR residual in the set of PR residuals may be determined based on a difference between the measured PR and the predicted PR.

In another example, the PRs may include a measured PR and a predicted PR, and each PR residual in the set of PR residuals may be a measure of a difference between the measured PR and the predicted PR.

At 1808, the positioning device or the positioning entity may determine an estimated position of the positioning device based on the sets of determined PR residuals, such as described in connection with FIG. 15. For example, the GNSS device 1402 may estimate a position of the positioning device based on the distribution of PR residuals. The estimation of the position of the positioning device may be performed by, e.g., the SPS module 1916/the positioning ML component 198 of the apparatus 1904, and/or the positioning ML component 199 of the network entity 1902 in FIG. 19.

In one example, the positioning device or the positioning entity may determine, based on an ML classifier, a likelihood of whether the positioning device is approximate to the grid point based on the corresponding set of determined PR residuals, where the estimated position of the positioning device may be determined based on the determined likelihoods, such as described in connection with FIG. 15. The determination of the likelihood of whether the positioning device is approximate to the grid point may be performed by, e.g., the SPS module 1916/the positioning ML component 198 of the apparatus 1904, and/or the positioning ML component 199 of the network entity 1902 in FIG. 19.

In another example, the likelihood of whether the positioning device is approximate to the grid point may be classified by the ML classifier based on a distribution of PR residuals in each set of PR residuals.

In another example, the positioning device or the positioning entity may determine for each SV of the set of SVs at least a geometric orientation with respect to the UE, and determining, based on an ML classifier and the determined geometric orientation with respect to the UE for each SV of at least a subset of the set of SVs, a relative PR weight for each SV of the set of SVs, where the estimated position of the UE is further determined based on the relative PR weight for each SV of the set of SVs. In such an example, the geometric orientation may be a function of at least an azimuth angle and a zenith angle between the UE and a corresponding SV of the set of SVs. In such an example, the relative PR weight for one SV of the set of SVs may be based on a spherical distance between the one SV and each SV of the at least the subset of the set of SVs, the spherical distance between the one SV and an other SV being based on the geometric orientation of the one SV compared to the geometric orientation of the other SV. In such an example, the relative PR weight for one SV of the set of SVs may be further based on one or more of a carrier-to-noise ratio, an auto-correlation function, a code-carrier phase consistency, measurement status or error flags, consistency between different band measurements of the one SV, weighted least squares a-posteriori residuals, or signal integration information. In such an example, the relative PR weight may be based on a predicted relative PR error by the ML classifier.

FIG. 19 is a diagram 1900 illustrating an example of a hardware implementation for an apparatus 1904. The apparatus 1904 may be a UE, a component of a UE, or may implement UE functionality. In some aspects, the apparatus 1904 may include a cellular baseband processor 1924 (also referred to as a modem) coupled to one or more transceivers 1922 (e.g., cellular RF transceiver). The cellular baseband processor 1924 may include on-chip memory 1924'. In some aspects, the apparatus 1904 may further include one or more subscriber identity modules (SIM) cards 1920 and an application processor 1906 coupled to a secure digital (SD) card 1908 and a screen 1910. The application processor 1906 may include on-chip memory 1906'. In some aspects, the apparatus 1904 may further include a Bluetooth module 1912, a WLAN module 1914, an SPS module 1916 (e.g., GNSS module), one or more sensor modules 1918 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1926, a power supply 1930, and/or a camera 1932. The Bluetooth module 1912, the WLAN module 1914, and the SPS module 1916 may include an on-chip transceiver (TRX) (or in some cases, just a receiver (RX)). The Bluetooth module 1912, the WLAN module 1914, and the SPS module 1916 may include their own dedicated antennas and/or utilize the antennas 1980 for communication. The cellular baseband processor 1924 communicates through the transceiver(s) 1922 via one or more antennas 1980 with the UE 104 and/or with an RU associated with a network entity 1902. The cellular baseband processor 1924 and the application processor 1906 may each include a computer-readable medium/memory 1924', 1906', respectively. The additional memory modules 1926 may also be considered a computer-readable medium/memory. Each computer-readable medium/memory 1924', 1906', additional memory modules 1926 may be non-transitory. The cellular baseband processor 1924 and the application processor 1906 are each responsible for general processing, including the execution of software stored on the computer-readable medium/memory. The software, when executed by the cellular baseband processor 1924/application processor 1906, causes the cellular baseband processor 1924/application processor 1906 to perform the various functions described supra. The computer-readable medium/memory may also be used for storing data that is manipulated by the cellular baseband processor 1924/application processor 1906 when executing software. The cellular baseband processor 1924/application processor 1906 may be a component of the UE 350 and may include the memory 360 and/or at least one of the TX processor 368, the RX processor 356, and the controller/processor 359. In one configuration, the apparatus 1904 may be a processor chip (modem and/or application) and include just the cellular baseband processor 1924 and/or the application processor 1906, and in another configuration, the apparatus 1904 may be the entire UE (e.g., see 350 of FIG. 3) and include the additional modules of the apparatus 1904.

As discussed supra, the positioning ML component 198/199 is configured to determine, for each grid point within a range of an initial position of a UE, a set of PR residuals based on PRs for each SV of a set of SVs; and determine an estimated position of the UE based on the sets of determined PR residuals. The positioning ML component 198 may be within the cellular baseband processor 1924, the application processor 1906, or both the cellular baseband processor 1924 and the application processor 1906. The positioning ML component 198/199 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1904 may include a variety of components configured for various functions. In one configuration, the apparatus 1904, and in particular the cellular baseband processor 1924 and/or the application processor 1906, includes means for determining, for each grid point within a range of an initial position of a UE, a set of PR residuals based on PRs for each SV of a set of SVs; means for determining an estimated position of the UE based on the sets of determined PR residuals; means for measuring, for each SV of the set of SVs, the PR between the UE and the SV; means for predicting, for each grid point and for each SV of the set of SVs, the PR between the UE and the SV at the grid point; means for determining, based on a machine learning (ML) classifier, a likelihood of whether the UE is approximate to the grid point based on the corresponding set of determined PR residuals, where the estimated position of the UE is determined based on the determined likelihoods; means for determining for each SV of the set of SVs at least a geometric orientation with respect to the UE; and means for determining, based on an ML classifier and the determined geometric orientation with respect to the UE for each SV of at least a subset of the set of SVs, a relative PR weight for each SV of the set of SVs. In some examples, the means may be the positioning ML component 198 of the apparatus 1904 or configured to perform the functions recited by the means. As described supra, the apparatus 1904 may include the TX processor 368, the RX processor 356, and the controller/processor 359. As such, in one configuration, the means may be the TX processor 368, the RX processor 356, and/or the controller/processor 359 configured to perform the functions recited by the means. In other examples, the means may be the positioning ML component 199 of the network entity 1902 configured to perform the functions recited by the means. As described supra, the network entity 1902 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of position estimation, including: determining, for each grid point within a range of an initial position of a UE, a set of PR residuals based on PRs for each SV of a set of SVs; and determining an estimated position of the UE based on the sets of determined PR residuals.

Aspect 2 is the method of aspect 1, where the PRs include a measured PR and a predicted PR, and each PR residual in the set of PR residuals is a measure of a difference between the measured PR and the predicted PR.

Aspect 3 is the method of any of aspects 1 and 2, further including measuring, for each SV of the set of SVs, the PR between the UE and the SV.

Aspect 4 is the method of any of aspects 1 to 3, further including predicting, for each grid point and for each SV of the set of SVs, the PR between the UE and the SV at the grid point.

Aspect 5 is the method of any of aspects 1 to 4, where each PR residual in the set of PR residuals is determined based on a difference between a measured PR and the predicted PR.

Aspect 6 is the method of any of aspects 1 to 5, further including determining, based on an ML classifier, a likelihood of whether the UE is approximate to the grid point based on the corresponding set of determined PR residuals, where the estimated position of the UE is determined based on the determined likelihoods.

Aspect 7 is the method of any of aspects 1 to 6, where the likelihood of whether the UE is approximate to the grid point is classified by the ML classifier based on a distribution of PR residuals in each set of PR residuals.

Aspect 8 is the method of any of aspects 1 to 7, further including: determining for each SV of the set of SVs at least a geometric orientation with respect to the UE; and determining, based on an ML classifier and the determined geometric orientation with respect to the UE for each SV of at least a subset of the set of SVs, a relative PR weight for each SV of the set of SVs, where the estimated position of the UE is further determined based on the relative PR weight for each SV of the set of SVs.

Aspect 9 is the method of any of aspects 1 to 8, where the geometric orientation is a function of at least an azimuth angle and a zenith angle between the UE and a corresponding SV of the set of SVs.

Aspect 10 is the method of any of aspects 1 to 9, where the relative PR weight for one SV of the set of SVs is based on a spherical distance between the one SV and each SV of the at least the subset of the set of SVs, the spherical distance between the one SV and an other SV being based on the geometric orientation of the one SV compared to the geometric orientation of the other SV.

Aspect 11 is the method of any of aspects 1 to 10, where the relative PR weight for one SV of the set of SVs is further based on one or more of a carrier-to-noise ratio, an auto-correlation function, a code-carrier phase consistency, measurement status or error flags, consistency between different band measurements of the one SV, weighted least squares a-posteriori residuals, or signal integration information.

Aspect 12 is the method of any of aspects 1 to 11, where the relative PR weight is based on a predicted relative PR error by the ML classifier.

Aspect 13 is an apparatus for position estimation for implementing any of aspects 1 to 12.

Aspect 14 is an apparatus for position estimation including means for implementing any of aspects 1 to 12.

Aspect 15 is a computer-readable medium storing computer executable code, where the code when executed by a processor causes the processor to implement any of aspects 1 to 12.

What is claimed is:

1. An apparatus for position estimation, comprising:
at least one memory; and
at least one processor coupled to the at least one memory and, based at least in part on information stored in the at least one memory, the at least one processor is configured to:
determine, for each grid point within a range of an initial position of a user equipment (UE), a set of pseudorange (PR) residuals based on PRs for each space vehicle (SV) of a set of SVs;

determine, based on a machine learning (ML) classifier, a likelihood of whether the UE is approximate to a grid point based on a distribution pattern of PR residuals in a corresponding set of PR residuals; and
determine an estimated position of the UE based on the likelihood of whether the UE is approximate to the grid point.

2. The apparatus of claim 1, wherein the PRs comprise a measured PR and a predicted PR, and each PR residual in the set of PR residuals is a measure of a difference between the measured PR and the predicted PR.

3. The apparatus of claim 1, wherein the at least one processor is further configured to measure, for each SV of the set of SVs, the PR between the UE and the SV.

4. The apparatus of claim 1, wherein the at least one processor is further configured to predict, for each grid point and for each SV of the set of SVs, the PR between the UE and the SV at the grid point.

5. The apparatus of claim 4, wherein to determine the set of PR residuals, the at least one processor is configured to determine each PR residual in the set of PR residuals based on a difference between a measured PR and a predicted PR.

6. The apparatus of claim 1, wherein to determine, based on the ML classifier, the likelihood of whether the UE is approximate to the grid point based on the distribution pattern of PR residuals in the corresponding set of PR residuals, the at least one processor is configured to:
input, to the ML classifier, the distribution pattern of PR residuals in the corresponding set of PR residuals; and
receive, from the ML classifier as inference output, the likelihood of whether the UE is approximate to the grid point.

7. The apparatus of claim 1, wherein the distribution pattern of PR residuals in the corresponding set of PR residuals is different when the grid point is closer to an actual position of the UE compared to the grid point is further away from the actual position of the UE.

8. The apparatus of claim 1, wherein the at least one processor is further configured to:
determine for each SV of the set of SVs at least a geometric orientation with respect to the UE; and
determine, based on the ML classifier or a second ML classifier and the determined geometric orientation with respect to the UE for each SV of at least one subset of the set of SVs, a relative PR weight for each SV of the set of SVs,
wherein to determine the estimated position of the UE, the at least one processor is further configured to determine the estimated position of the UE based on the relative PR weight for each SV of the set of SVs.

9. The apparatus of claim 8, wherein the geometric orientation is a function of at least an azimuth angle and a zenith angle between the UE and a corresponding SV of the set of SVs.

10. The apparatus of claim 8, wherein the relative PR weight for one SV of the set of SVs is based on a spherical distance between the one SV and each SV of the at least one subset of the set of SVs, the spherical distance between the one SV and an other SV being based on the geometric orientation of the one SV compared to the geometric orientation of the other SV.

11. The apparatus of claim 10, wherein the relative PR weight for one SV of the set of SVs is further based on one or more of a carrier-to-noise ratio, an auto-correlation function, a code-carrier phase consistency, measurement status or error flags, consistency between different band measurements of the one SV, weighted least squares a-posteriori residuals, or signal integration information.

12. The apparatus of claim 8, wherein the relative PR weight is based on a predicted relative PR error by the ML classifier.

13. A method of position estimation, comprising:
determining, for each grid point within a range of an initial position of a user equipment (UE), a set of pseudorange (PR) residuals based on PRs for each space vehicle (SV) of a set of SVs;
determining, based on a machine learning (ML) classifier, a likelihood of whether the UE is approximate to a grid point based on a distribution pattern of PR residuals in a corresponding set of PR residuals; and
determining an estimated position of the UE based on the likelihood of whether the UE is approximate to the grid point.

14. The method of claim 13, wherein the PRs comprise a measured PR and a predicted PR, and each PR residual in the set of PR residuals is a measure of a difference between the measured PR and the predicted PR.

15. The method of claim 13, further comprising measuring, for each SV of the set of SVs, the PR between the UE and the SV.

16. The method of claim 13, further comprising predicting, for each grid point and for each SV of the set of SVs, the PR between the UE and the SV at the grid point.

17. The method of claim 16, wherein determining the set of PR residuals comprises determining each PR residual in the set of PR residuals based on a difference between a measured PR and a predicted PR.

18. The method of claim 13, wherein determining, based on the ML classifier, the likelihood of whether the UE is approximate to the grid point based on the distribution pattern of PR residuals in the corresponding set of PR residuals comprises:
inputting, to the ML classifier, the distribution pattern of PR residuals in the corresponding set of PR residuals; and
receiving, from the ML classifier as inference output, the likelihood of whether the UE is approximate to the grid point.

19. The method of claim 13, wherein the distribution pattern of PR residuals in the corresponding set of PR residuals is different when the grid point is closer to an actual position of the UE compared to the grid point is further away from the actual position of the UE.

20. The method of claim 13, further comprising:
determining for each SV of the set of SVs at least a geometric orientation with respect to the UE; and
determining, based on the ML classifier or a second ML classifier and the determined geometric orientation with respect to the UE for each SV of at least one subset of the set of SVs, a relative PR weight for each SV of the set of SVs,
wherein determining the estimated position of the UE comprises determining the estimated position of the UE based on the relative PR weight for each SV of the set of SVs.

21. The method of claim 20, wherein the geometric orientation is a function of at least an azimuth angle and a zenith angle between the UE and a corresponding SV of the set of SVs.

22. The method of claim 20, wherein the relative PR weight for one SV of the set of SVs is based on a spherical distance between the one SV and each SV of the at least one subset of the set of SVs, the spherical distance between the one SV and an other SV being based on the geometric orientation of the one SV compared to the geometric orientation of the other SV.

23. The method of claim 22, wherein the relative PR weight for one SV of the set of SVs is further based on one or more of a carrier-to-noise ratio, an auto-correlation function, a code-carrier phase consistency, measurement status or error flags, consistency between different band measurements of the one SV, weighted least squares a-posteriori residuals, or signal integration information.

24. The method of claim 20, wherein the relative PR weight is based on a predicted relative PR error by the ML classifier.

25. An apparatus for position estimation, comprising:
means for determining, for each grid point within a range of an initial position of a user equipment (UE), a set of pseudorange (PR) residuals based on PRs for each space vehicle (SV) of a set of SVs;
means for determining, based on a machine learning (ML) classifier, a likelihood of whether the UE is approximate to a grid point based on a distribution pattern of PR residuals in a corresponding set of PR residuals; and
means for determining an estimated position of the UE based on the likelihood of whether the UE is approximate to the grid point.

26. The apparatus of claim 25, wherein the PRs comprise a measured PR and a predicted PR, and each PR residual in the set of PR residuals is a measure of an excess delay based on a comparison of the measured PR and the predicted PR.

27. The apparatus of claim 25, further comprising means for measuring, for each SV of the set of SVs, the PR between the UE and the SV.

28. The apparatus of claim 25, wherein the means for determining, based on the ML classifier, the likelihood of whether the UE is approximate to the grid point based on the distribution pattern of PR residuals in the corresponding set of PR residuals include configuring the apparatus to:
input, to the ML classifier, the distribution pattern of PR residuals in the corresponding set of PR residuals; and
receive, from the ML classifier as inference output, the likelihood of whether the UE is approximate to the grid point.

29. The apparatus of claim 25, wherein the distribution pattern of PR residuals in the corresponding set of PR residuals is different when the grid point is closer to an actual position of the UE compared to the grid point is further away from the actual position of the UE.

30. A non-transitory computer-readable medium storing computer executable code, the code when executed by a processor causes the processor to:
determine, for each grid point within a range of an initial position of a user equipment (UE), a set of pseudorange (PR) residuals based on PRs for each space vehicle (SV) of a set of SVs;
determine, based on a machine learning (ML) classifier, a likelihood of whether the UE is approximate to a grid point based on a distribution pattern of PR residuals in a corresponding set of PR residuals; and
determine an estimated position of the UE based on the likelihood of whether the UE is approximate to the grid point.

* * * * *